(12) United States Patent
Bommireddipalli et al.

(10) Patent No.: US 9,129,000 B2
(45) Date of Patent: Sep. 8, 2015

(54) METHOD AND SYSTEM FOR CENTRALIZED CONTROL OF DATABASE APPLICATIONS

(75) Inventors: Vijay R. Bommireddipalli, San Jose, CA (US); Stephen Andrew Brodsky, Los Gatos, CA (US); David Wei-Jye Chang, San Jose, CA (US); Anshul Dawra, San Jose, CA (US); Randall William Horman, Toronto (CA); Tony Kai-chi Leung, San Jose, CA (US); Paul Arnold Ostler, Yakima, WA (US)

(73) Assignee: International Business Machines Corporation, Armonk, NY (US)

( * ) Notice: Subject to any disclaimer, the term of this patent is extended or adjusted under 35 U.S.C. 154(b) by 452 days.

(21) Appl. No.: 12/771,104

(22) Filed: Apr. 30, 2010

(65) Prior Publication Data
US 2011/0270857 A1 Nov. 3, 2011

(51) Int. Cl.
G06F 17/30 (2006.01)

(52) U.S. Cl.
CPC .... *G06F 17/30595* (2013.01); *G06F 17/30306* (2013.01)

(58) Field of Classification Search
USPC .......................... 707/792, 781, 784–788, 791
See application file for complete search history.

(56) References Cited

U.S. PATENT DOCUMENTS

| | | | |
|---|---|---|---|
| 6,721,747 B2 * | 4/2004 | Lipkin | 709/209 |
| 6,850,893 B2 * | 2/2005 | Lipkin et al. | 705/7.11 |
| 6,854,010 B1 * | 2/2005 | Christian et al. | 709/223 |
| 7,072,934 B2 * | 7/2006 | Helgeson et al. | 709/203 |
| 7,123,608 B1 * | 10/2006 | Scott et al. | 370/353 |
| 7,383,287 B2 | 6/2008 | Ellison et al. | |
| 7,457,279 B1 * | 11/2008 | Scott et al. | 370/352 |
| 7,464,106 B2 | 12/2008 | Hinshaw et al. | |
| 7,562,093 B2 | 7/2009 | Gelb et al. | |
| 7,613,682 B2 | 11/2009 | Lim et al. | |
| 7,640,230 B2 * | 12/2009 | Hanson et al. | 1/1 |
| 8,078,597 B2 * | 12/2011 | Polk et al. | 707/705 |
| 2002/0073236 A1 * | 6/2002 | Helgeson et al. | 709/246 |

(Continued)

FOREIGN PATENT DOCUMENTS

| | | |
|---|---|---|
| JP | H11282850 | 10/1999 |
| JP | 2001084257 | 3/2001 |

(Continued)

OTHER PUBLICATIONS

PCT International Search Report and Written Opinion, PCT/EP2011/055829, Aug. 11, 2011, 10 pages.

(Continued)

*Primary Examiner* — Hanh Thai
(74) *Attorney, Agent, or Firm* — Mohammed Kashef; Edell, Shapiro & Finnan, LLC

(57) ABSTRACT

According to one embodiment of the present invention, a system enables control of database applications. The system comprises a computer system including a database application to provide access to a database system, and at least one processor. The computer system requests retrieval of application specific property information for the database application from a data repository, and applies the retrieved application specific property information to the database application to control operation of the database application. Embodiments of the present invention further include a method and computer program product for controlling database applications in substantially the same manner described above.

65 Claims, 12 Drawing Sheets

(56) References Cited

U.S. PATENT DOCUMENTS

| | | | |
|---|---|---|---|
| 2002/0161604 A1* | 10/2002 | Kardos et al. | 705/1 |
| 2003/0058280 A1* | 3/2003 | Molinari et al. | 345/771 |
| 2005/0086195 A1 | 4/2005 | Tan et al. | |
| 2005/0193033 A1 | 9/2005 | Davis et al. | |
| 2006/0074965 A1 | 4/2006 | Cunningham et al. | |
| 2006/0155387 A1* | 7/2006 | Pieronek | 700/1 |
| 2006/0165105 A1* | 7/2006 | Shenfield et al. | 370/401 |
| 2006/0291664 A1* | 12/2006 | Suarez et al. | 380/286 |
| 2007/0156659 A1* | 7/2007 | Lim | 707/3 |
| 2007/0156670 A1* | 7/2007 | Lim | 707/4 |
| 2007/0156694 A1* | 7/2007 | Lim | 707/9 |
| 2007/0156695 A1* | 7/2007 | Lim | 707/9 |
| 2007/0156696 A1* | 7/2007 | Lim | 707/9 |
| 2007/0156727 A1* | 7/2007 | Lim | 707/100 |
| 2007/0156897 A1* | 7/2007 | Lim | 709/225 |
| 2007/0157203 A1* | 7/2007 | Lim | 718/100 |
| 2007/0157287 A1* | 7/2007 | Lim | 726/1 |
| 2007/0157288 A1* | 7/2007 | Lim | 726/1 |
| 2007/0162749 A1* | 7/2007 | Lim | 713/167 |
| 2007/0244987 A1* | 10/2007 | Pedersen et al. | 709/217 |
| 2007/0245409 A1* | 10/2007 | Harris et al. | 726/5 |
| 2007/0288474 A1 | 12/2007 | Baba et al. | |
| 2007/0293212 A1* | 12/2007 | Quon et al. | 455/420 |
| 2008/0059474 A1* | 3/2008 | Lim | 707/9 |
| 2008/0060051 A1* | 3/2008 | Lim | 726/1 |
| 2008/0065589 A1 | 3/2008 | Birka et al. | |
| 2008/0066148 A1* | 3/2008 | Lim | 726/1 |
| 2008/0066149 A1* | 3/2008 | Lim | 726/1 |
| 2008/0066150 A1* | 3/2008 | Lim | 726/1 |
| 2008/0071728 A1* | 3/2008 | Lim | 707/1 |
| 2008/0083014 A1* | 4/2008 | Lim | 726/1 |
| 2008/0091682 A1* | 4/2008 | Lim | 707/9 |
| 2008/0109424 A1 | 5/2008 | Day et al. | |
| 2008/0222093 A1* | 9/2008 | Fan et al. | 707/2 |
| 2008/0301760 A1* | 12/2008 | Lim | 726/1 |
| 2009/0199211 A1* | 8/2009 | Chang et al. | 719/317 |
| 2009/0240711 A1 | 9/2009 | Levin | |
| 2009/0276771 A1* | 11/2009 | Nickolov et al. | 717/177 |
| 2009/0327242 A1 | 12/2009 | Brown et al. | |
| 2010/0023582 A1* | 1/2010 | Pedersen et al. | 709/203 |
| 2010/0082517 A1 | 4/2010 | Schapker, II et al. | |
| 2011/0029508 A1* | 2/2011 | Al-Omari et al. | 707/718 |

FOREIGN PATENT DOCUMENTS

| | | |
|---|---|---|
| JP | 2007018309 | 1/2007 |
| WO | 2009020472 A1 | 2/2009 |

OTHER PUBLICATIONS

German Office Action dated Dec. 10, 2013, 6 pages.
Arens et al., "Query Reformulation for dynamic Information Integration", USC/Information Sciences Institute, Jan. 1996, 38 pages.
Takashi Kishiwada, "Do you offer perfect protection against the Act on the Protection of Personal Information? Urgent need for DB security", DB Magazine, Japan, vol. 14, No. 13, pp. 48-59, Feb. 1, 2005.

* cited by examiner

METHOD AND SYSTEM FOR CENTRALIZED CONTROL OF DATABASE APPLICATIONS

BACKGROUND

1. Technical Field

Present invention embodiments relate to control of database applications, and more specifically, to centralized control of enterprise database applications across one or more application servers.

2. Discussion of the Related Art

An enterprise usually has a large number of database applications. Each of these database applications defines associated properties, some of which are application specific, and provides a mechanism for data access. However, the tasks of controlling and optimizing database applications are very complex and tedious. For example, database administrators are forced to optimize each database application individually across multiple servers and multiple geographies. Current systems controlling connection properties on a server provide ineffective control of these properties across multiple servers spread over multiple geographies. Further, database administrators lack the ability to: centrally control the SQL execution model; centrally control, optimize and restrict the SQL that is executed; and control the number of open connections from multiple clients without an intermediate system acting as a centralized gateway.

BRIEF SUMMARY

According to one embodiment of the present invention, a system enables control of database applications. The system comprises a computer system including a database application to provide access to a database system, and at least one processor. The computer system requests retrieval of application specific property information for the database application from a data repository, and applies the retrieved application specific property information to the database application to control operation of the database application. Embodiments of the present invention further include a method and computer program product for controlling database applications in substantially the same manner described above.

The features and advantages of the present invention will become apparent upon consideration of the following detailed description of example embodiments thereof, particularly when taken in conjunction with the accompanying drawings wherein like reference numerals in the various figures are utilized to designate like components.

DETAILED DESCRIPTION

Present invention embodiments pertain to a mechanism for centrally controlling enterprise database applications (e.g., including or associated with software applications processing data from a database to perform desired actions, the corresponding underlying processes implementing database access to retrieve data from the database for that processing, connections to the database, and/or query language (e.g., SQL, etc.) execution models). This mechanism provides centralized control of database connection properties, and of the number of open connections from database clients to a given database without forcing database applications to utilize a centralized gateway. The number of connections may be a property of a database and indicate the number of open connections allowed to the database, where actions of the database application are controlled based on the number of connections to the database. For example, database applications may take different courses of action based on the number of connections to the database being active or exhausted. Alternatively, the number of connections may be a property of a database application and indicate the number of open connections allowed to be maintained in a connection pool.

In addition, present invention embodiments enable administrators (e.g., database administrators, system administrators or other users) to secure, optimize, and control which particular query language (e.g., SQL, etc.) statements are executed in the database, and the manner of execution of those statements. Centralized control is provided over the query language (e.g., SQL, etc.) execution model to enable the administrators to distribute optimized query language (e.g., SQL, etc.) statements to all enterprise database applications. These optimizations may be applied without modifying source code of the database applications. Thus, present invention embodiments provide a framework and define an underlying protocol for centrally controlling and monitoring database applications.

Figure 1:
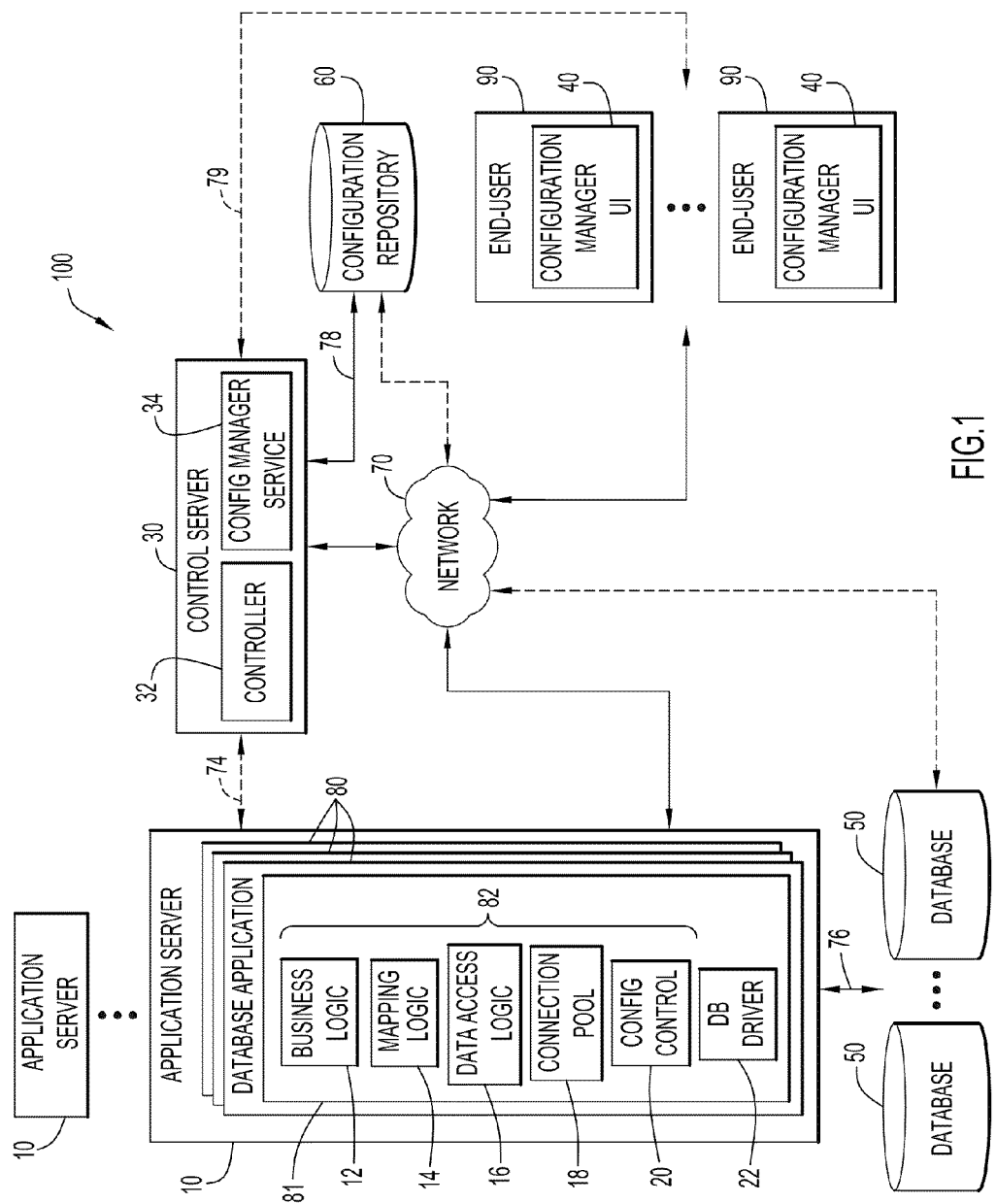
FIG. 1 is a diagrammatic illustration of an example topology for a control system according to an embodiment of the present invention.

An example topology for a control system according to an embodiment of the present invention is illustrated in FIG. 1. Specifically, control system 100 includes one or more application servers 10 and a control server 30. The control server centrally controls database applications of application servers 10 as described below. Control server 30 may be remote from application servers 10, and communicate over a network 70. The network may be implemented by any number of any suitable communications media (e.g., wide area network (WAN), local area network (LAN), Internet, Intranet, etc.). Alternatively, control server 30 may be local to one or more application servers 10 and communicate via communication medium 74. The communication medium may be implemented by any suitable communication media (e.g., local area network (LAN), hardwire, wireless link, Intranet, etc.).

Each application server 10 is coupled to a corresponding transaction or other database 50, and accesses the database to retrieve data for performing various functions or actions. Each application server 10 and corresponding database 50 may be remote from each other, and communicate over network 70. Alternatively, the application servers and corresponding databases may be local to each other and communicate via a communication medium 76. The communication medium may be implemented by any suitable communication media (e.g., local area network (LAN), hardwire, wireless link, Intranet, etc.). In the case of a database 50 being accessible by a network (e.g., LAN or WAN), the database may include, or be in the form of, a database server. The database server may be implemented by any conventional or other computer systems preferably equipped with a display or monitor, a base (e.g., including the processor, memories and/or internal or external communications devices (e.g., modem, network cards, etc.)), optional input devices (e.g., a keyboard, mouse or other input device), and any commercially available and/or custom software (e.g., server/communications software, etc.).

Each application server 10 includes one or more database applications 80 (e.g., including or associated with software applications processing data from a corresponding database 50 to perform desired actions, the corresponding underlying processes implementing database access to retrieve data from a corresponding database 50 for that processing, connections to a corresponding database 50, and/or query language (e.g., SQL, etc.) execution models). The software applications processing data from database 50, and the corresponding underlying processes (e.g., including managing database connections) are provided in a program stack 81. Each application server 10 includes one or more database applications 80 each with a program stack 81, including a plurality of layers 82 that interoperate to provide access to a corresponding database 50 and implement a query language (e.g., SQL, etc.) execution model. Program stack 81 may include layers 82 that provide direct access to the database (e.g., Java Database Connectivity (JDBC) or IBM DB2 Call Level Interface (CLI)), or indirect database access (e.g., via various frameworks including IBM pureQuery, Java Persistent API (JPA), Hibernate, etc.). By way of example only, program stack layers 82 include business logic 12, mapping logic 14, data access logic 16, connection pool 18, configuration control 20, and database driver 22. Business logic 12 includes software applications that process data from a corresponding database 50 to provide business or other functions for a particular implementation.

These software applications typically include one or more database queries to retrieve and process data from a corresponding database 50. Mapping logic 14 maps database tables to objects of a particular computer programming language (e.g., Java, C++, etc.). For example, with respect to a Java implementation of business logic 12 and a relational database 50, mapping logic 14 may map Java based objects of business logic 12 to relational database tables of database 50. The mapping logic enables a query from business logic 12 with Java based objects to retrieve appropriate data from the relational tables of database 50, and further provides the retrieved data from those relational database tables to business logic 12 in terms of the Java based objects. In other words, the mapping logic provides data management compatibility between the Java based business logic and the database. Mapping logic 14 may include any suitable mapping tools or frameworks (e.g., Java Persistent API (JPA), Hibernate, etc.) for any desired computer programming language.

Data access logic 16 provides the manner in which to access the database (e.g., rules or criteria, connection or other information, etc.), while connection pool 18 provides connection allocation management functions (e.g., controls a number of connections to the database, etc.). The number of connections may be a property of a database and indicate the number of open connections allowed to the database, where actions of the database application are controlled based on the number of connections to the database. For example, database applications may take different courses of action based on the number of connections to the database being active or exhausted. Alternatively, the number of connections may be a property of a database application and indicate the number of open connections allowed to be maintained by connection pool 18. Configuration control 20 communicates with control server 30 to configure database applications and facilitate execution of database queries (e.g., may include IBM pureQuery or other frameworks) in accordance with specifications of an administrator (e.g., database administrator, system administrator, or other user) as described below. Database driver 22 provides actual communication with a corresponding database 50 for the database access. Database driver 22 may include a Java database driver (e.g., JDBC, etc.), or other drivers or mechanisms compatible with any suitable computer programming language. Business logic 12, mapping logic 14, data access logic 16, connection pool 18, configuration control 20, and database driver 22 may be implemented by any combination of software and/or hardware modules or units.

Each database application 80 is associated with application specific property information including various properties or parameters that control the manner in which a corresponding database 50 is accessed. The application specific property information of a database application may pertain to application server 10 and/or one or more program stack layers 82. By way of example only, properties or parameters of application specific property information relating to: an application server 10 may include maxconnections (e.g., a maximum number of connections created for a data source connection pool), minconnections (e.g., a minimum number of connections for a data source connection pool), unusedtimeout (e.g., a timeout value representing an amount of time an open connection is permitted to remain unused before being closed), reaptime (e.g., specifies an amount of time in seconds between runs of a connection pool maintenance thread), etc.; mapping logic 14 may include for a JPA or Hibernate implementation hibernate.cache.use_query_cache (e.g., specifies if query results are cached by a Hibernate engine); and data access logic 16 may include for a JDBC or IBM DB2 CLI implementation databaseurl (e.g., database connection information (e.g., host, port, database name)), deferprepares (e.g., specifies if query language statement preparations are deferred until execution of that statement), fetchsize (e.g., specifies a fetch size used for query language statements), etc., and for an IBM pureQuery implementation captureMode (e.g., controls capture enablement and disablement), executionMode (e.g., specifies if the query language statement execution is static or dynamic), allowDynamicSQL (e.g., specifies if dynamic SQL is permitted), etc. Application specific property information for business logic 12 vary for each specific implementation, and may include any properties or parameters suitable for that specific implementation.

In addition, each database application 80 (e.g., via program stack 81) implements an execution model with associated application specific property information including properties or parameters that control the manner in which a database query in the form of a query language (e.g., SQL, etc.) statement is executed. The execution model and associated properties or parameters relate to the specific ability of the framework of configuration control 20 (e.g., IBM pureQuery, etc.) to control execution of the query language (e.g., SQL, etc.) from the database application. Example properties or parameters of application specific property information for the execution of the query language may indicate dynamic or static execution of the query language (e.g., SQL, etc.), and execution of original or optimized query language (e.g., SQL, etc.). Optimizing the query language may include replacing poorly performing query language (e.g., SQL, etc.) statements with better performing statements, or replacing query language (e.g., SQL, etc.) statement parameters with parameter markers, thereby enabling the statements to be cached and reused. Accordingly, the application specific property information including the values for the various properties or parameters described above provide a configuration for a database application, and control the manners in which the database is accessed and query language (e.g., SQL, etc.) statements are executed.

Application servers 10 may be implemented by any conventional or other computer systems preferably equipped with a display or monitor, a base (e.g., including the processor, memories and/or internal or external communications devices (e.g., modem, network cards, etc.)), optional input devices (e.g., a keyboard, mouse or other input device), and any commercially available (e.g., server/communications software, etc.) and/or custom software (e.g., control software, etc.) to control the database applications as described below. Transaction databases 50 may be implemented by any number of any types of conventional or other databases, data stores, or storage structures (e.g., files, databases, data structures, etc.).

An enterprise usually has a large number of database applications, where each database application is optimized individually across multiple servers and multiple geographies as described above. However, present invention embodiments provide a manner to centrally configure and control the database applications across plural servers. In order to provide this central control capability, control server 30 enables an administrator (e.g., database administrator, system administrator, or other user) to configure one or more database applications of various application servers by defining, entering, and/or modifying any of the application specific property information associated with those database applications (e.g., properties of an application server 10, layers 82 of the corresponding program stacks, database connections, and/or the query language (e.g., SQL, etc.) execution model). The entered or modified application specific property information is provided to the corresponding application servers and consequently applied to configure the database applications.

In particular, control server 30 is coupled to a configuration repository 60 that stores application specific property or parameter information for the database applications. The control server accesses configuration repository 60 to retrieve and provide the application specific property information to one or more application servers 10 for configuring and controlling corresponding database applications 80 as described below. Control server 30 and configuration repository 60 may be remote from each other, and communicate over network 70. Alternatively, control server 30 may be local to configuration repository 60 and communicate via a communication medium 78. The communication medium may be implemented by any suitable communication media (e.g., local area network (LAN), hardwire, wireless link, Intranet, etc.). In the case of configuration repository 60 being accessible by a network (e.g., LAN or WAN), the repository may include or be in the form of a database server. The database server may be implemented by any conventional or other computer systems preferably equipped with a display or monitor, a base (e.g., including the processor, memories and/or internal or external communications devices (e.g., modem, network cards, etc.)), optional input devices (e.g., a keyboard, mouse or other input device), and any commercially available and/or custom software (e.g., server/communications software, etc.).

Control server 30 enables administrators to define for application specific property information logical and hierarchical groupings of database application properties. The properties may be grouped based on various criteria, including the data source, the database, the particular administrator, and the workstation.

Configuration control 20 establishes communication with control server 30 to retrieve application specific property information from configuration repository 60 for a corresponding database application in order to configure that database application. Present invention embodiments may be executed on heterogeneous application servers, and may support heterogeneous configuration control components written in any computer programming language. Communications between the application and control servers may be attained via synchronous or asynchronous communications. The retrieved application specific property information is utilized to configure a corresponding database application on an application server 10. Accordingly, control server 30 includes a controller 32 and a configuration manager service 34. Controller 32 communicates with configuration control 20 of an application server 10, and interoperates with configuration manager service 34 to retrieve requested application specific property information for a corresponding database application from configuration repository 60. The retrieved application specific property information is transferred by the controller to the requesting application server.

Configuration manager service 34 accesses configuration repository 60 to retrieve and store application specific property and other information therein. Further, the configuration manager service interacts with one or more end-user systems 90 via a configuration manager interface 40. The configuration manager interface enables an administrator (e.g., database administrator, system administrator, or other user) to view and/or modify application specific property information within configuration repository 60 to control the database applications of application servers 10 as described below. Configuration manager interface 40 is generated by configuration manager service 34, and may be presented to the administrator on an end-user system 90. End-user system 90 and control server 30 may be remote from each other, and communicate over network 70. Alternatively, end-user system 90 may be local to control server 30 and communicate via communication medium 79. The communication medium may be implemented by any suitable communication media (e.g., local area network (LAN), hardwire, wireless link, Intranet, etc.). Controller 32, configuration manager service 34, and configuration manager interface 40 may be implemented by any combination of software and/or hardware modules or units.

Control server 30 and end-user systems 90 may be implemented by any conventional or other computer systems preferably equipped with a display or monitor, a base (e.g., including the processor, memories and/or internal or external communications devices (e.g., modem, network cards, etc.)), optional input devices (e.g., a keyboard, mouse or other input device), and any commercially available (e.g., server, browser, or other communications software, etc.) and/or custom software (e.g., control software, etc.) to control the database applications as described below. Configuration repository 60 may be implemented by any number of any types of conventional or other databases, data stores, or storage structures (e.g., files, databases, data structures, etc.).

Configuration manager interface 40 enables an administrator (e.g., database administrator, system administrator, or other user) to view, define, enter, and/or modify application specific property information within configuration repository 60 to configure and control database applications 80 of application servers 10. Each database application 80 is assigned a unique identifier, while application specific property information providing configurations for the database applications are stored within configuration repository 60 based on a configuration identifier (e.g., identifier 113 (FIGS. 3-6)). In this manner, the configuration identifier functions as an index or key to retrieve the appropriate application specific property information to provide a desired configuration for a database application. For example, the configuration identifier may be utilized to retrieve a filename, pointer or other indicator indicating the location of application specific property information within configuration repository 60 (e.g., a lookup table may be employed to provide the location of application specific property information based on the configuration identifier, etc.). Alternatively, the configuration identifier may be the filename, pointer or other indicator, or be an index into a database table containing the location information for application specific property information (e.g., the configuration identifier may be a key field within a database table, etc.).

In an embodiment of the present invention, a database application may be associated with a single configuration, and the configuration identifier may be the same as the database application identifier. For example, the database application identifier may include a logical name, and identify application specific property information defining configurations for database applications (including program stacks with multiple layers). The administrator may have knowledge of logical names for database applications, and provide a logical name (or database application identifier) during entry of information that becomes the configuration identifier to associate application specific property information defining a configuration with a database application.

Alternatively, the administrator may enter one or more attributes of a database application (e.g., URL or address, etc.), and configuration manager service 34 may ascertain the logical name (or database application identifier) for the desired database application based on the attributes (e.g., by communicating with application servers, via a lookup or other table including database application attributes and logical names, etc.). In this case, the determined logical name (or database application identifier) becomes the configuration identifier and is utilized to associate the application specific property information defining the configuration with the desired database application.

Accordingly, the database application identifier may be utilized by an application server 10 to retrieve from configuration repository 60 appropriate application specific property information defining a configuration for a database application 80. For example, a database application 80 on an application server 10 may be assigned a logical name of "A." A lookup for application specific property information defining a configuration for that database application within configuration repository 60 is performed based on the logical name "A" (which is both the database application identifier and the configuration identifier), and the resulting application specific property information is applied (e.g., to the layers in the program stack of the database application). Similarly, another database application on the same or different application server may be assigned a logical name of "B." The lookup for the application specific property information defining a configuration for this other database application is performed based on the logical name "B" (which is both the database application identifier and the configuration identifier), and the resulting application specific property information is applied (e.g., to the layers in the program stack of the other database application).

In an embodiment of the present invention, a plurality of configurations may be defined for a database application 80. In this case, an application server 10 may provide the database application identifier and additional information in order to determine a configuration identifier 113 and retrieve the appropriate application specific property information defining a particular configuration from configuration repository 60. By way of example, the additional information may include attributes of a desired configuration (e.g., description of properties, configuration name, date(s) of creation or modification (to retrieve most recent, oldest, etc.), etc.), and configuration manager service 34 may determine the desired configuration identifier 113 based on the database application identifier and attributes (e.g., via a lookup or other table including configuration attributes and logical names, etc.). In addition, configuration identifier 113 may include the database application identifier with the additional information appended to or otherwise incorporated into the database application identifier, where the configuration identifier may be determined and provided by the application server to retrieve the application specific property information defining a desired configuration.

Alternatively, application specific property information defining respective database application configurations may each be associated with a configuration identifier 113 specific to that configuration (e.g., independent of the database application identifier and assigned during creation/modification of the configuration) that associates the application specific property information for that configuration with a database application. In this case, configuration identifier 113 may be provided by an application server 10 (with or without a database application identifier) to retrieve the application specific property information for that configuration. Configuration identifier 113 may alternatively include this specific configuration identifier appended to or incorporated into a database application identifier, where configuration identifier 113 may be determined and provided by the application server to retrieve application specific property information for a configuration.

Figure 2:
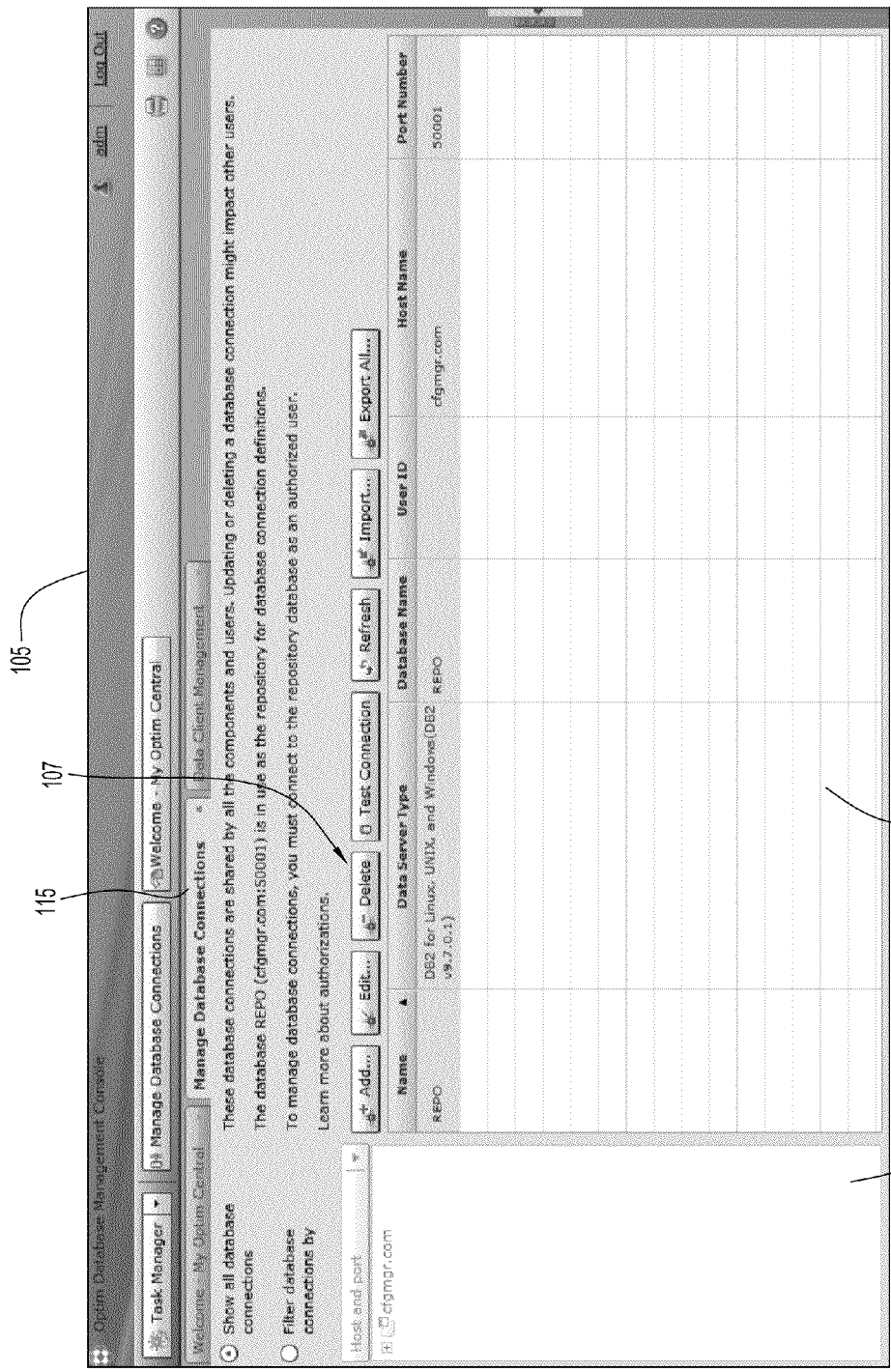
FIG. 2 is a schematic illustration of an example graphical user interface screen providing database connection information according to an embodiment of the present invention.

Configuration manager interface 40 preferably utilizes a plurality of graphical user interface screens in order to interact with an administrator (e.g., database administrator, system administrator, or other user) and configure database applications. The configuration manager interface is generated by configuration manager service 34, and may be presented to the administrator on an end-user system 90. An example interface screen providing information pertaining to database connections is illustrated in FIG. 2. Specifically, interface screen 105 provides information concerning database connections within the enterprise system. The interface screen includes a plurality of tabs 115 each selectable by the administrator to display various information. By way of example, tabs 115 include Welcome, Manage Database Connections, and Data Client Management. Interface screen 105 further includes a host area 111 and a working area 117, and reflects an example screen displayed in response to actuation of Manage Database Connections tab 115. Host area 111 provides various hosts in a directory type structure for selection by the administrator. Once the administrator selects a host (e.g., via a mouse or other input device), connection information for the selected host is retrieved from configuration repository 60, and displayed in working area 117. By way of example, working area 117 includes a table with columns including Name, Data Server Type, Database Name, User ID, Host Name, and Port Number. The Name field includes the name of the database connection. The Data Server Type field provides the type of database server (e.g., server software employed, etc.). The Database Name field includes the name of the database, while the User ID field includes an identification of the user. The Host Name field includes the name (e.g., URL or address, etc.) of the host computer system, and the Port Number field includes the port being utilized for the connection.

Each row of the table provides information for a selected item (e.g., the selected host, cfgmgr.com as viewed in FIG. 2). Interface screen 105 enables the administrator to add (or register) new database connections to the control system, and to subsequently view, edit, and/or delete those database connections via actuators 107. The information entered by the administrator for the database connections is stored by configuration manager service 34 in configuration repository 60.

Figure 3:
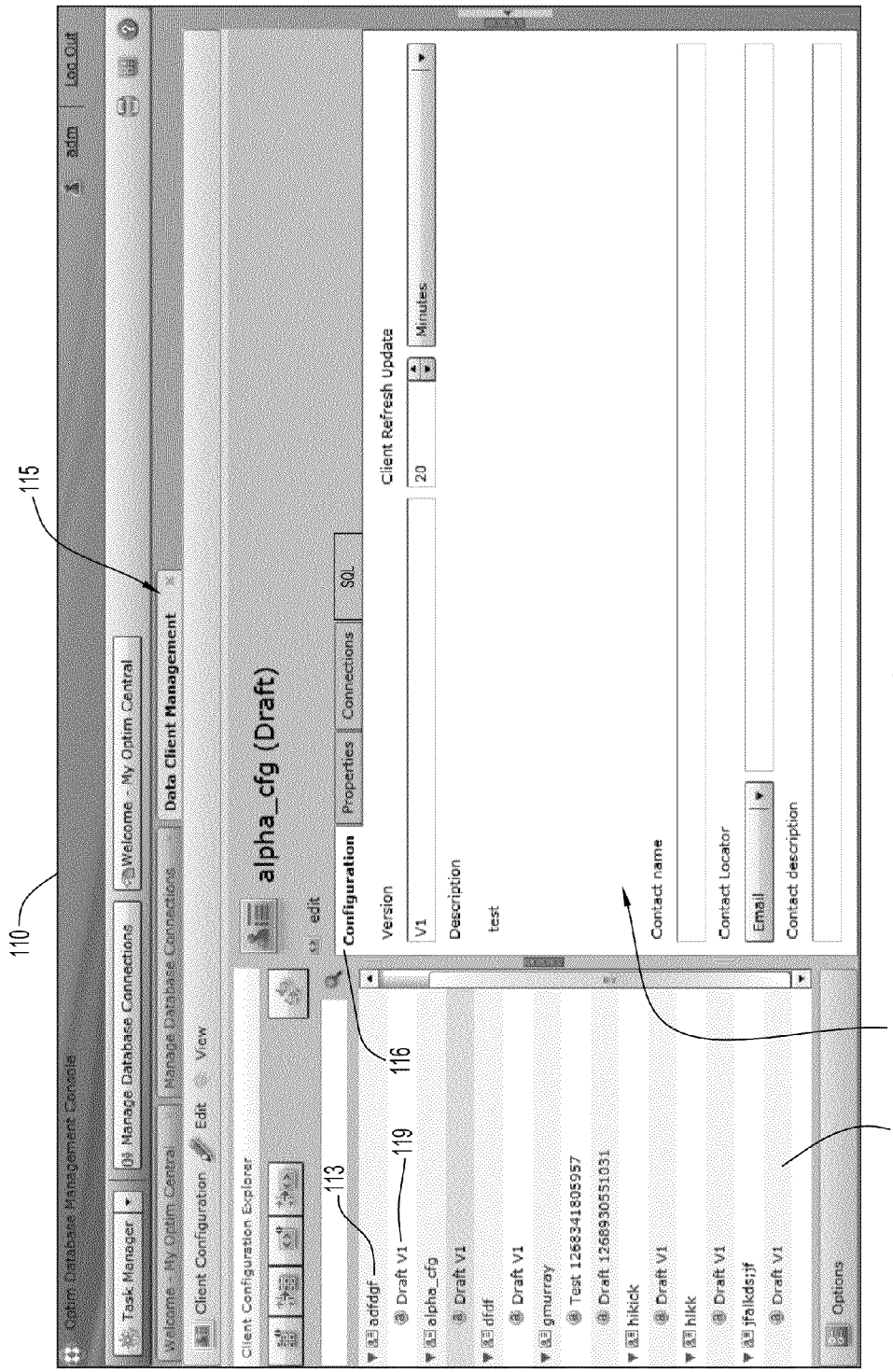
FIG. 3 is a schematic illustration of an example graphical user interface screen providing configuration information for a database application according to an embodiment of the present invention.

An example interface screen providing configuration information for a database application is illustrated in FIG. 3. Specifically, interface screen 110 provides information concerning the configuration of a database application on an application server 10. Interface screen 110 reflects an example screen displayed in response to actuation of Data Client Management tab 115. The interface screen includes a configuration area 112, and a working area 114. Configuration area 112 provides various configurations of database applications for selection by an administrator (e.g., database administrator, system administrator, or other user). The configurations include application specific property information, and are indicated by a configuration version 119, and configuration identifier or key 113 that associates the configuration with a database application as described above. Working area 114 includes a plurality of tabs 116 each selectable by the administrator to display various information pertaining to the selected configuration. By way of example, tabs 116 include Configuration, Properties, Connections, and SQL. Interface screen 110 further reflects an example screen displayed in response to actuation of Configuration tab 116. The Configuration tab enables display of the selected configuration in working area 114.

Once the administrator selects a configuration (e.g., via a mouse or other input device), information for the selected configuration is retrieved from configuration repository 60, and displayed in working area 114. By way of example, working area 114 includes fields labeled Version, Client Refresh Update, Description, Contact name, Contact Locator, and Contact description. The Version field includes the version of the configuration, while the Client Refresh Update field includes the time interval for refreshing the information and the corresponding time units (e.g., minutes, etc.). The Description field includes a description of the selected configuration. The Contact name, Contact Locator, and Contact description fields respectively include the name of a contact person (e.g., administrator creating/modifying or responsible for the version of the configuration, etc.), the manner of notifying the contact person with corresponding notification information (e.g., electronic mail (E-mail) and a corresponding e-mail address, etc.), and a description of the contact person (e.g., job title, responsibility, etc.). The information in the various fields may be entered and/or modified by the administrator to update information for the selected configuration, where this information is stored by configuration manager service 34 in configuration repository 60.

Figure 4:
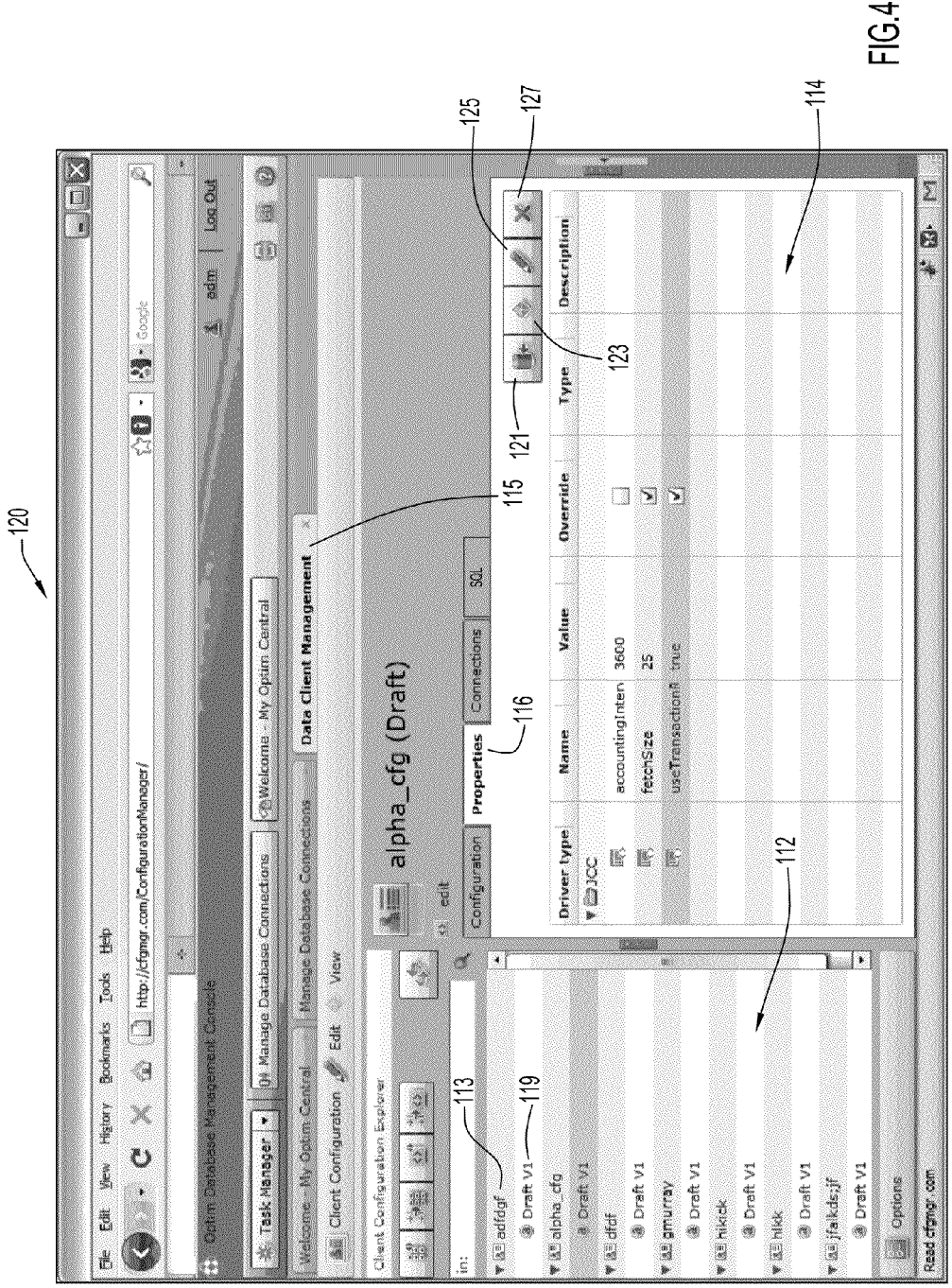
FIG. 4 is a schematic illustration of an example graphical user interface screen providing application specific property information associated with a database application according to an embodiment of the present invention.

An example interface screen enabling an administrator (e.g., database administrator, system administrator, or other user) to view, define, and/or edit application specific property information of a database application is illustrated in FIG. 4. Specifically, interface screen 120 is similar to interface screen 110 described above, and provides information concerning application specific property information of a database application. Interface screen 120 reflects an example screen displayed in response to actuation of Data Client Management tab 115 and Properties tab 116. The interface screen includes configuration area 112, and working area 114. Configuration area 112 provides various configurations of database applications for selection by the administrator, where the configurations are indicated by configuration identifier or key 113 and configuration version 119 as described above. Once the administrator selects a configuration (e.g., via a mouse or other input device), application specific property information for the selected configuration is retrieved from configuration repository 60, and displayed in working area 114. By way of example, working area 114 displays a table with columns including Driver Type, Name, Value, Override, Type, and Description. The Driver Type field includes the type of driver, while the Name field includes the name of a property within the application specific property information. The Value field includes the value of the property within the application specific property information. The Type field includes the type of the property value (e.g., integer, character, etc.), and the description field includes a description of the property within the application specific property information.

The Override field determines the property value to be utilized for a database application. When override is enabled for a property within the application specific property information (e.g., a check symbol is present for a property (e.g., fetchSize and useTransactionR as viewed in FIG. 4)), the value for that property specified in the table is utilized for the database application configuration. If override is disabled for a property within the application specific property information (e.g., a check symbol is absent for a property (e.g., accountingInter as viewed in FIG. 4)), the value for the property set by the database application (e.g., an initial or default value) is utilized. However, when the value for a property within the application specific property information with override disabled has not been set by the database application (e.g., an initial or default value is absent for the property), the value specified in the table for that property is utilized.

Each row of the table provides application specific property information for a selected item (e.g., a JCC driver includes the properties of accountingInter with a value of 3600 and override disabled, fetchSize with a value of 25 and override enabled, and useTransactionR with a value of true and override enabled as viewed in FIG. 4). Interface screen 120 further enables the administrator to enter and/or modify properties within application specific property information. This is accomplished by use of various actuators. In particular, save actuator 121 facilitates storage of entered property values, while delete actuator 127 enables deletion of a property selected from the table. New actuator 123 facilitates display of an entry window with corresponding fields to define and enter values for a new property of an item selected from the table. Edit actuator 125 enables the value of a selected property to be changed. The application specific property information including properties and corresponding values are stored by configuration manager service 34 in configuration repository 60.

Figure 5:
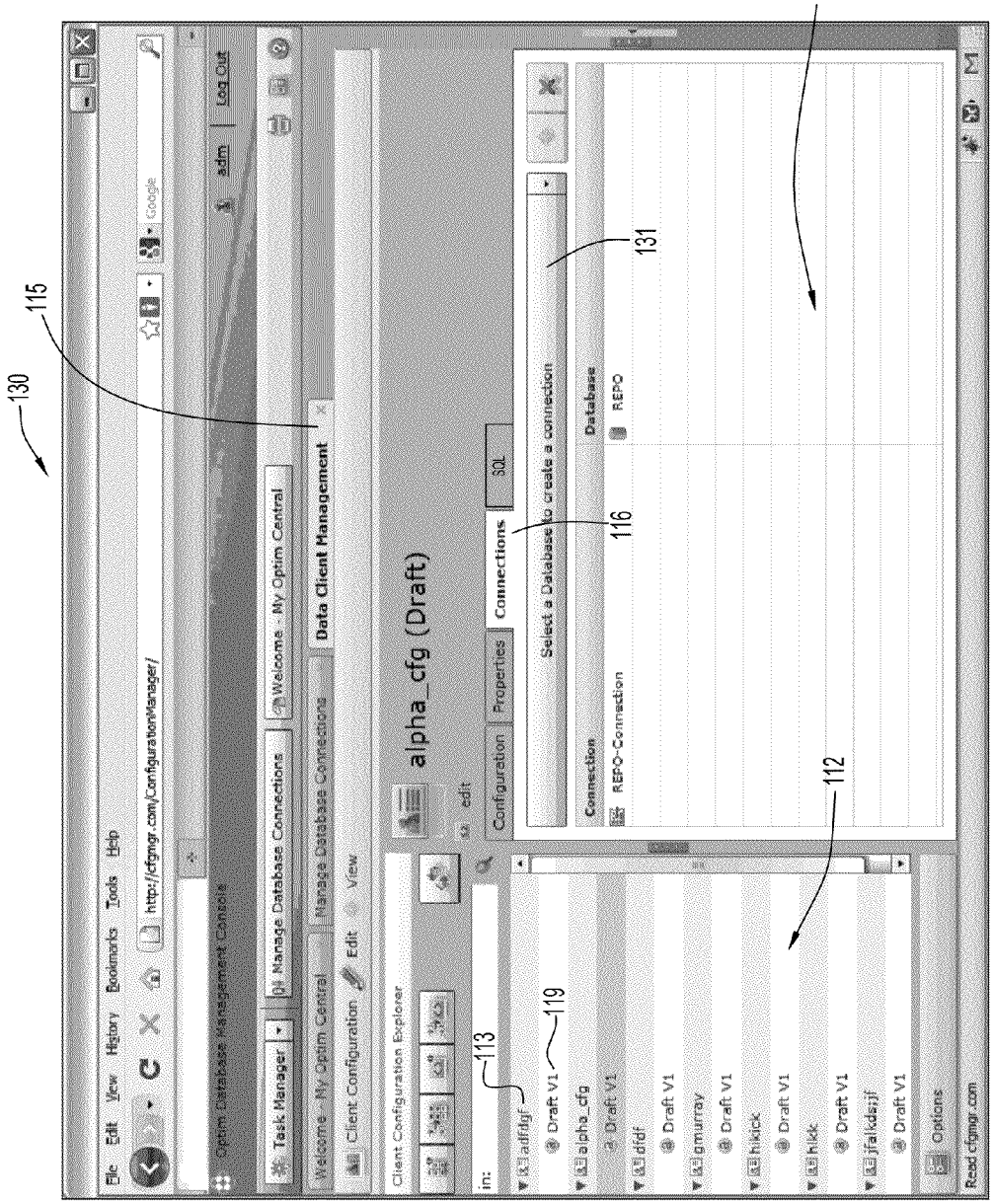
FIG. 5 is a schematic illustration of an example graphical user interface screen providing connection information pertaining to database connections for a database application according to an embodiment of the present invention.

An example interface screen providing connection information for a database application is illustrated in FIG. 5. Specifically, interface screen 130 is similar to interface screens 110, 120 described above, and provides information concerning database connections for a selected database application configuration. Interface screen 130 reflects an example screen displayed in response to actuation of Data Client Management tab 115 and Connections tab 116. The interface screen includes configuration area 112, and working area 114. Configuration area 112 provides various configurations of database applications for selection by an administrator (e.g., database administrator, system administrator, or other user), where the configurations are indicated by configuration identifier or key 113 and configuration version 119 as described above. Once the administrator selects a configuration (e.g., via a mouse or other input device), connection information for the selected configuration is retrieved from configuration repository 60, and displayed in working area 114. By way of example, working area 114 displays a table with columns including Connection and Database. The Connection field includes the name of the database application connection, while the Database field includes the database to which the connection establishes a communication link.

Each row of the table provides information for a selected item (e.g., a REPO-Connection is associated with a REPO database). Interface screen 130 enables the administrator to create a connection from a database application to a selected database via a create actuator 131. The create actuator facilitates display of an entry window with corresponding fields to define and enter information for a new connection. Properties and corresponding values for the created connection may be viewed, entered, and/or modified via one or more interface screens in substantially the same manners described above. The connection information and corresponding application specific property information is stored by configuration manager service 34 in configuration repository 60.

Present invention embodiments further enable administrators (e.g., database administrators, system administrators, or other users) to influence the query language (e.g., SQL, etc.) execution model at the application server. The execution model and associated properties or parameters relate to the specific ability of the framework of configuration control 20 (e.g., IBM pureQuery, etc.) to control the query language (e.g., SQL, etc.) executed from the database application. Present invention embodiments enable an administrator (e.g., database administrator, system administrator, or other user) to provide optimized query language (e.g., SQL, etc.) statements. Optimizing the query language may include replacing poorly performing query language (e.g., SQL, etc.) statements with better performing statements, or replacing query language (e.g., SQL, etc.) statement parameters with parameter markers, thereby enabling the statements to be cached and reused.

Further, present invention embodiments may enable the administrator to restrict the query language (e.g., SQL, etc.) statements that are executed, and to control batching of query language (e.g., SQL, etc.) statements transferred from the database application to database 50 for execution. The application specific property information including properties or parameters for the query language (e.g., SQL, etc.) execution model are stored in configuration repository 60.

Accordingly, present invention embodiments enable administrators (e.g., database administrators, system administrators, or other users) to optimize frameworks (e.g., JPA, etc.), where the query language (e.g., SQL, etc.) is automatically generated. Present invention embodiments enable the administrators to capture, view, optimize, and restrict the query language (e.g., SQL, etc.) being executed against a database. Once the query language (e.g., SQL, etc.) has been optimized for a database application, the optimization may be transferred to other systems hosting database applications, thereby providing centralized control of the query language (e.g., SQL, etc.) execution model.

Figure 6:
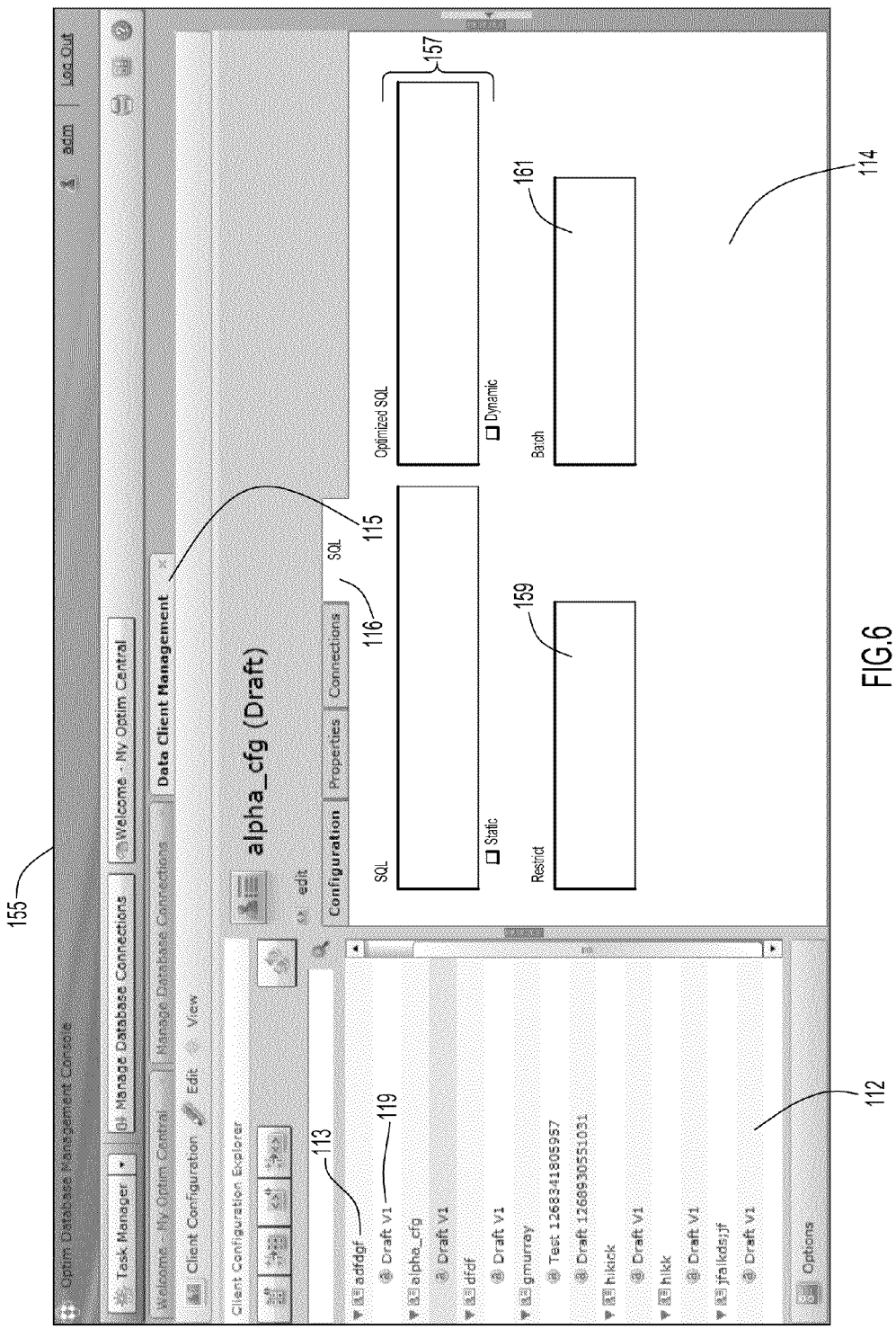
FIG. 6 is a schematic illustration of an example graphical user interface screen providing information pertaining to a query language (e.g., SQL, etc.) execution model for a database application according to an embodiment of the present invention.

An example interface screen to enable an administrator (e.g., database administrator, system administrator, or other user) to view and enter various information pertaining to the query language (e.g., SQL, etc.) execution model for a database application is illustrated in FIG. 6. Specifically, interface screen 155 is similar to interface screens 110, 120, 130 described above, and provides information concerning the query language (e.g., SQL, etc.) execution model for a selected database application configuration. Interface screen 155 reflects an example screen displayed in response to actuation of Data Client Management tab 115 and SQL tab 116. The interface screen includes configuration area 112, and working area 114. Configuration area 112 provides various configurations of database applications for selection by the administrator, where the configurations are indicated by configuration identifier or key 113 and configuration version 119 as described above.

Once the administrator selects a configuration (e.g., via a mouse or other input device), query language (e.g., SQL, etc.) execution model information of the application specific property information for the selected configuration is retrieved from configuration repository 60, and displayed in working area 114. By way of example, working area 114 includes an optimization area 157, a restriction area 159, and a batch area 161. These areas may be automatically populated with the appropriate configuration information retrieved from configuration repository 60. Optimization area 157 includes fields to enable the administrator to view and/or enter optimized query language (e.g., SQL, etc.) for particular statements executed within the selected database application configuration. The administrator may further view and/or indicate the type of execution (e.g., static or dynamic as described below) for the optimized statements and the manner of implementation (e.g., binding or replacement, etc.) within the optimization area. The information entered by the administrator for the optimized query language (e.g., SQL, etc.) is stored as part of the application specific property information by configuration manager service 34 in configuration repository 60.

Restriction area 159 includes a field to enable the administrator to view and/or enter a list of query language (e.g., SQL, etc.) statements that are permitted to be executed on a given database. The information entered by the administrator for the restriction area is stored as part of the application specific property information by configuration manager service 34 in configuration repository 60.

Batch area 161 includes a field to enable the administrator to view and/or specify the query language (e.g., SQL, etc.) statements that are to be batched together for execution. Batching combines multiple query language (e.g., SQL, etc.) executions into a single request to the database, thereby enhancing performance. For example, connection usage may be optimized by use of a heterogeneous batch, and delaying the execution until a transaction is committed. This enables a framework to assign the physical connection to the database application for a small amount of time for the execution. This batch may be specified in one or more properties or parameters associated with the database application, and entered within a field of batch area 161. The information entered by the administrator for the batch area is stored as part of the application specific property information by configuration manager service 34 in configuration repository 60.

Configuration manager service 34 may interact with administrators (e.g., database administrators, system administrators, or other users) to receive information to enable control of other aspects of a database application. For example, the control system may enable the administrators to centrally transfer optimized object to relational (O/R) mapping properties to application servers (e.g., to avoid configuring these settings on each individual application server) as part of the application specific property information. In this case, the properties are associated with at least mapping logic 14 of program stack 81, and control the mapping of objects within computer programming languages to relational tables or other structures within a database. By way of example, the properties may control the precision of object loading (or mapping) from database tables (e.g., lazy loading (less precision) or eager loading (greater precision)). However, any suitable application specific property information of the database application may be adjusted via interface 40 to control the mapping of objects to a relational or other type of database.

Further, the control system may control which administrators (e.g., database administrators, system administrators, or other users) are allowed to execute and enforce rules on database objects that are being created. A profile may be established to abstract an administrator from a database connection. The profile encapsulates a database connection (without requiring use of a user identification and password), and includes criteria for authentication (e.g., type of the user, source computer system, security or system level of the user, user identifications, etc.). Information for the profile and associated database object rules may be entered by the administrator via configuration manager interface 40 and configuration manager service 34, and stored as part of the application specific property information in configuration repository 60.

Configuration control 20 retrieves the profile and associated rules as part of the application specific property information for the database application, and utilizes the profile to authenticate an administrator (e.g., perform a call out with veto power, etc.). If the administrator is authenticated (e.g., as a database, system or other administrator), configuration control 20 enables the authenticated administrator to establish and enforce rules to control access to objects of a corresponding database 50. In this manner, the administrator may use a connection without many privileges to access the underlying database to read catalog objects, and utilize the profile for establishment and enforcement of rules.

An administrator (e.g., database administrator, system administrator, or other user) may specify values for or modify any database application properties of the application specific property information (e.g., associated with the application server, any of the program stack layers, any of the connections, the query language (e.g., SQL, etc.) execution model, etc.) via interface 40 or other input mechanisms to centrally configure and control any portion of the database application from control server 30. The application specific property information defining a configuration may further apply to one or more database applications of the same application server, or to one or more database applications of any number of different application servers. The database applications for a configuration may be grouped by any suitable criteria, where the same configuration identifier is utilized by each group member to enable retrieval of the same configuration for the group members.

Figure 7:
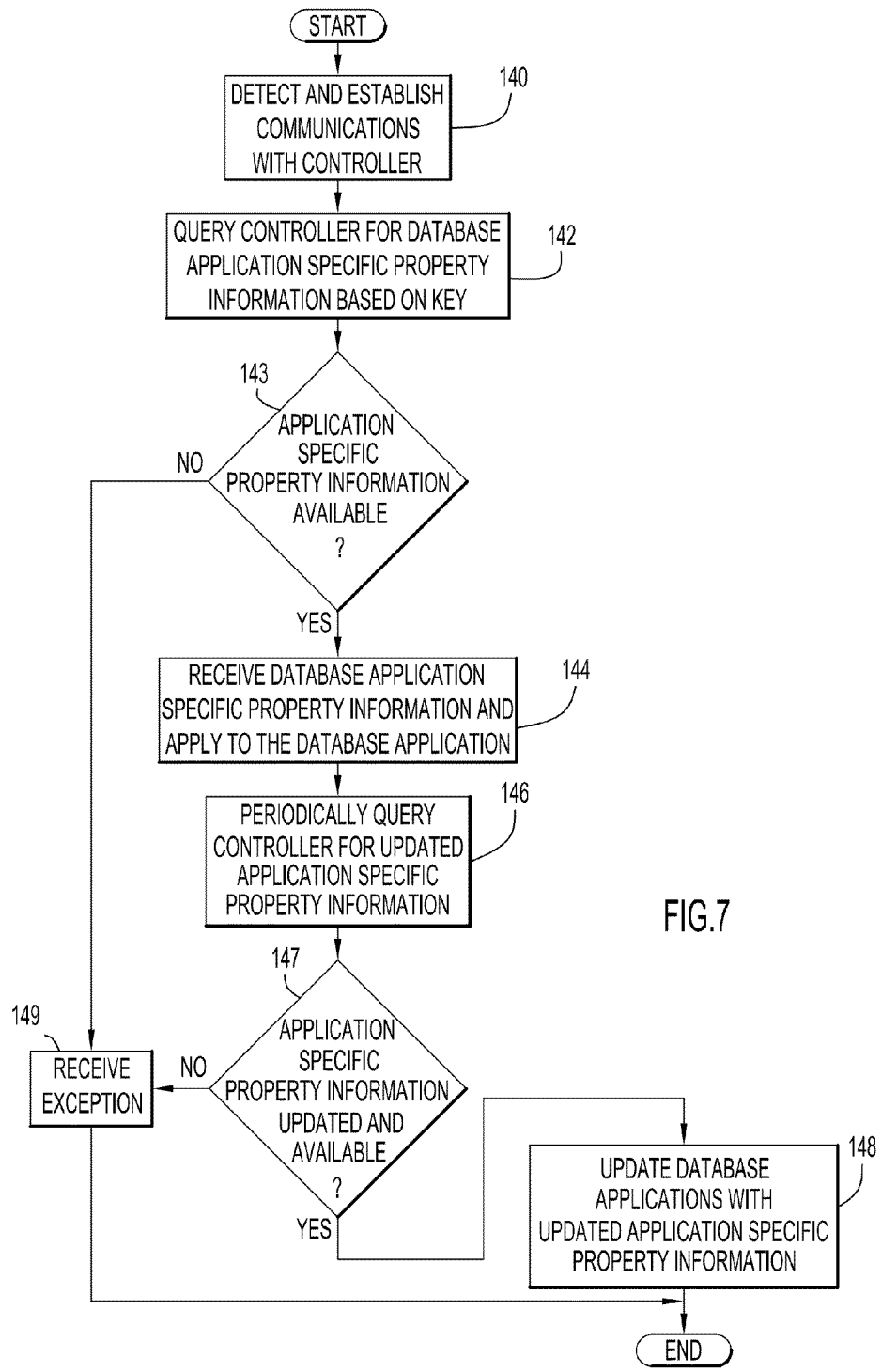
FIG. 7 is a procedural flowchart illustrating the manner in which an application server retrieves application specific property information for database applications according to an embodiment of the present invention.

The manner in which an application server 10 (e.g., via configuration control 20) retrieves and applies application specific property information to control database applications is illustrated in FIG. 7. Initially, database application specific property information (e.g., including properties for application server 10, layers 82 of program stack 81, database connections, and/or the query language (e.g., SQL, etc.) execution model) are defined, grouped, and registered with controller 32 via configuration manager interface 40 as described above. If centralized control is employed for a database application of an application server 10, configuration control 20 detects the presence of control server 30 and establishes appropriate communications with the control server at step 140. The detection may be accomplished by utilizing a flag, uniform resource locator (URL) or address, or other indicator of the presence of the control server that is accessible to configuration control 20 (e.g., stored in configuration variables, a predetermined location, a parameter, etc.). The configuration control utilizes a specified URL or address for control server 30 to establish communications with controller 32. Alternatively, the configuration control may include an automatic detection mechanism to determine the presence (and URL or address) of the control server on a network to establish communications.

Once the appropriate communications are established, configuration control 20 queries controller 32 for the desired application specific property information for a corresponding database application 80 based on configuration identifier or key 113 at step 142. Configuration control 20 passes configuration identifier 113 (and/or other information enabling determination of the configuration identifier as described above) to controller 32 to retrieve application specific property information defining a desired configuration from the configuration repository via configuration manager service 34.

If no application specific property information is retrieved as determined at step 143, configuration control 20 receives from controller 32 an exception or message indicating the lack of application specific property information at step 149, and the database application proceeds with initial or default property values. Configuration control 20 and/or controller 32 may facilitate display of an error or other message to an administrator to provide notification of a problem with respect to retrieving application specific property information and/or configuring the database application.

When application specific property information is retrieved, configuration control 20 receives the retrieved application specific property information from controller 32, and applies the property values within the received application specific property information to configure the database application at step 144. In particular, configuration control 20 modifies existing parameter or property values with the values in the received application specific property information. This may be accomplished by updating or storing the received values in corresponding configuration variables, memory or other storage locations (e.g., files, registers, etc.) containing existing property or parameter values (e.g., locations from which the application server and program stack layers expect to find stored parameters for operation and/or implementation of the query language (e.g., SQL, etc.) execution model). Once the received property values are applied, the database application configuration is updated, and the database application operates in accordance with those received values.

Configuration control 20 periodically checks to determine the presence of any updates to the database application specific property information at step 146. For example, this may be accomplished by configuration manager service 34 identifying entry and/or updates of application specific property information during interactions with an administrator (e.g., database administrator, system administrator, or other user) via configuration manager interface 40. The configuration manager service notifies controller 32 of the presence of updated information and the associated configuration identifier 113 of each updated configuration. In response to an inquiry for updates from configuration control 20, controller 32 determines the presence of updates within the application specific property information. If the application specific property information has been updated, controller 32 attempts to retrieve the updated application specific property information from configuration repository 60 based on configuration identifier 113 in substantially the same manner described above.

If no application specific property information has been updated, or when updated application specific property information cannot be retrieved based on configuration identifier 113 as determined at step 147, configuration control 20 receives from controller 32 an exception or message indicating the lack of updated application specific property information at step 149, and the database application proceeds with the prior property values. Configuration control 20 and/or controller 32 may facilitate display of an error or other message to an administrator to provide notification of a lack of updated application specific property information, or the existence of a problem with respect to retrieving updated application specific property information and/or configuring the database application.

When updated application specific property information is retrieved, controller 32 transfers the updated application specific property information to configuration control 20. The configuration control receives the updated application specific property information from controller 32, and applies the updated application specific property information to configure the database application at step 148 in substantially the same manner described above. Configuration control 20 and/or controller 32 sends the updated application specific property information to configuration repository 60 for auditing purposes. The configuration control may further persist the application specific property information locally on the application server.

Figure 8:
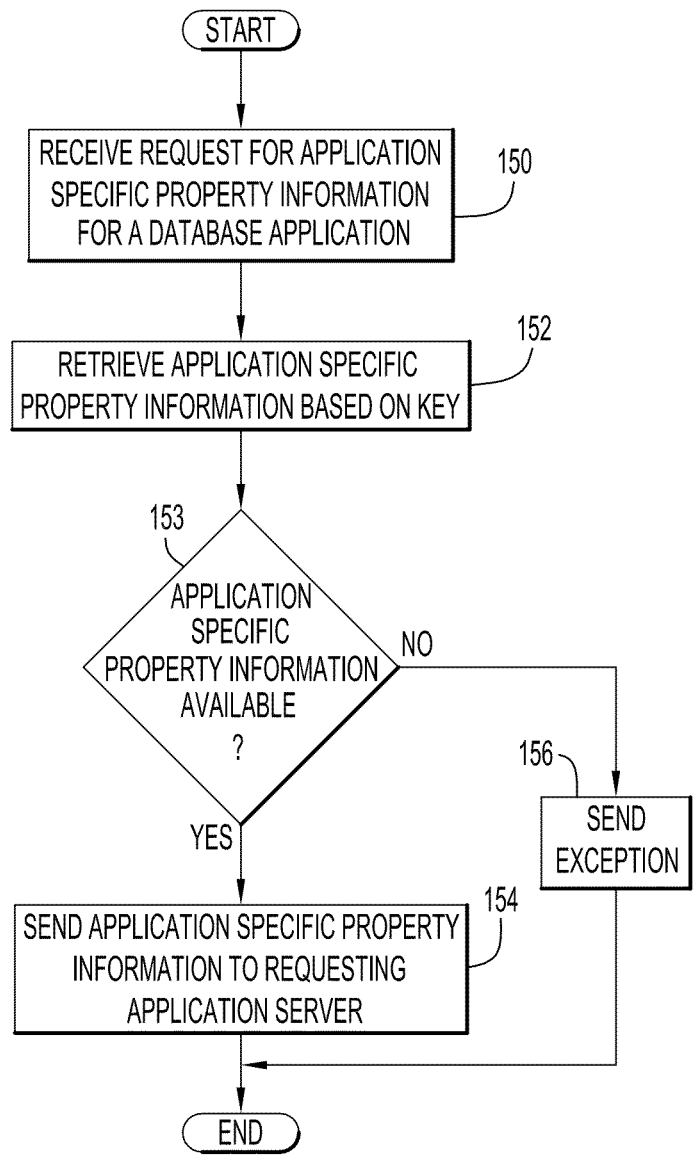
FIG. 8 is a procedural flowchart illustrating the manner in which application specific property information for database applications is retrieved from a configuration repository and provided to an application server according to an embodiment of the present invention.

The manner in which control server 30 retrieves corresponding application specific property information for database applications is illustrated in FIG. 8. Initially, database application specific property information (e.g., including properties for application server 10, layers 82 of program stack 81, database connections, and/or the query language (e.g., SQL, etc.) execution model) are defined, grouped, and registered with controller 32, and appropriate communications between an application server 10 and control server 30 are established as described above. Specifically, controller 32 receives a request for application specific property information defining a desired configuration for a corresponding database application from configuration control 20 of an application server 10 at step 150. The request may be for retrieval of application specific property information and includes configuration identifier 113 (and/or other information enabling determination of the configuration identifier as described above), or a periodic inquiry to retrieve updated application specific property information. The controller interoperates with configuration service manager 34 that communicates with configuration repository 60 to retrieve the application specific property information at step 152. Controller 32 provides configuration identifier 113 (and/or other information enabling determination of the configuration identifier as described above) to configuration manager service 34 to enable retrieval of the application specific property information defining the desired configuration. The configuration identifier (and/or other information enabling determination of the configuration identifier as described above) may be provided to controller 32 in the request, or the controller may possess the configuration identifier due to notification from the configuration manager service of updated information as described above.

If no application specific property information is retrieved, or no updated information exists as determined at step 153, an exception or message indicating the lack of application specific property information is transferred by controller 32 to configuration control 20 at step 156, and the database application proceeds with default or prior property values. Configuration control 20 and/or controller 32 may facilitate display of an error or other message to an administrator to provide notification of a lack of updated application specific property information, or the existence of a problem with respect to retrieving application specific property information and/or configuring the database application.

When application specific property information is retrieved from configuration repository 60, the retrieved application specific property information is received by configuration manager service 34 and provided to controller 32 for transfer to configuration control 20 at step 154 to update the database application configuration in substantially the same manner described above.

Figure 9:
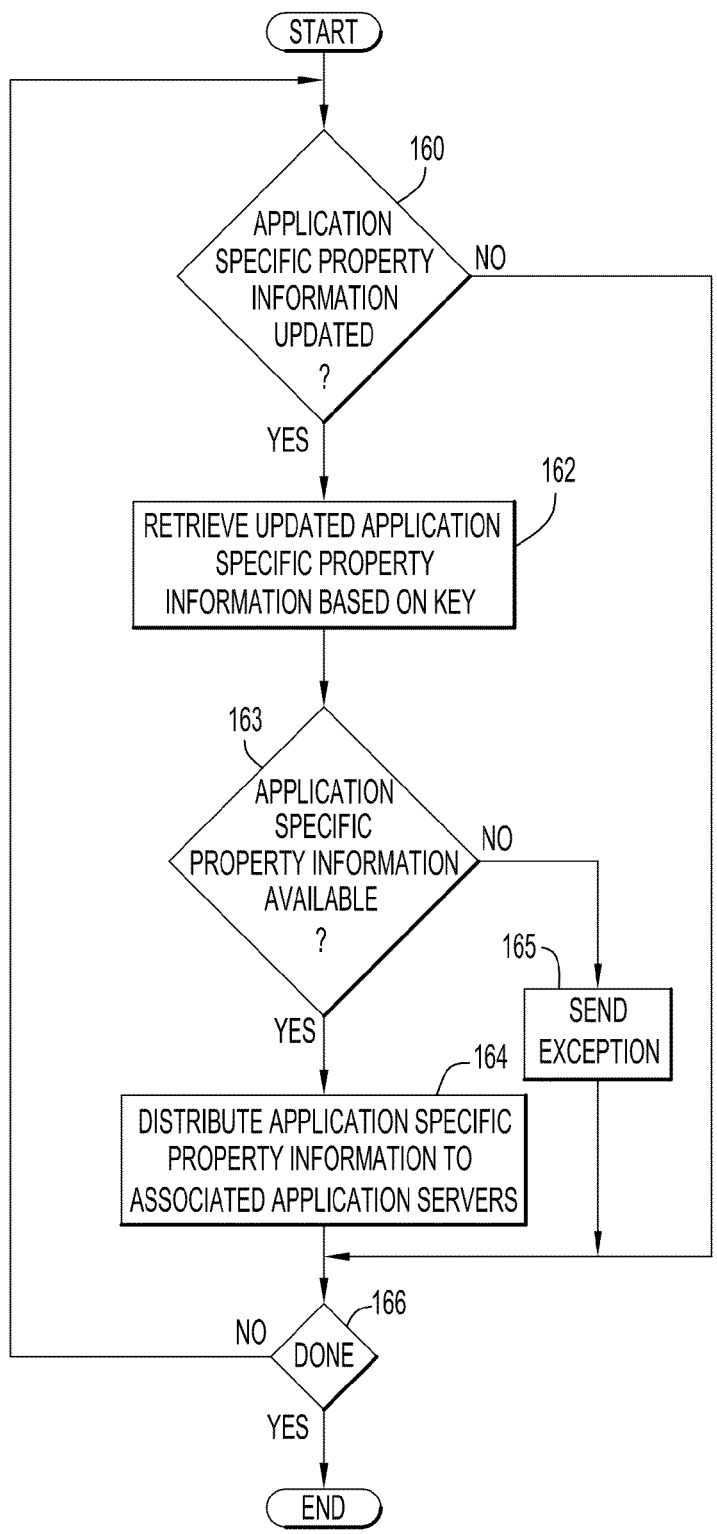
FIG. 9 is a procedural flowchart illustrating an alternative manner in which updated application specific property information for a database application is retrieved from a configuration repository and provided to an application server to update a database application configuration according to an embodiment of the present invention.

Alternatively, control server 30 may automatically provide updated application specific property information to an application server 10 instead of the application server polling the control server for the application specific property information. The manner in which control server 30 automatically provides updated application specific property information to an application server 10 is illustrated in FIG. 9. Initially, properties of application specific property information (e.g., including properties for application server 10, layers 82 of program stack 81, database connections, and/or the query language (e.g., SQL, etc.) execution model) are defined, grouped, and registered with controller 32, and appropriate communications between an application server 10 and control server 30 are established as described above. Specifically, controller 32 determines the presence of updated application specific property information. For example, this may be accomplished by configuration manager service 34 identifying entry and/or updates of application specific property information during interactions with an administrator (e.g., database administrator, system administrator, or other user) via configuration manager interface 40, and notifying controller 32 of the presence of updated application specific property information and the associated configuration identifier 113 of each updated configuration as described above.

If updates are present as determined at step 160, controller 32 retrieves the updated application specific property information from configuration repository 60 via configuration manager service 34 at step 162 based on configuration identifier 113 in substantially the same manner described above. If no updated application specific property information is retrieved as determined at step 163, the controller determines the appropriate application server hosting the database application associated with configuration identifier 113, and sends an exception or message indicating the existence of a problem retrieving updated application specific property information to configuration control 20 of that application server at step 165. In this case, the database application proceeds with the prior property values. Configuration control 20 and/or controller 32 may facilitate display of an error or other message to an administrator to provide notification of the existence of a problem with respect to retrieving application specific property information and/or configuring the database application.

If updated application specific property information is retrieved, the controller determines the appropriate application server hosting the database application associated with configuration identifier 113, and transfers the updated application specific property information to configuration control 20 of that application server at step 164. The configuration control receives the updated application specific property information from controller 32, and applies the updated application specific property information to configure the database application in substantially the same manner described above. The process repeats until occurrence of a terminating condition (e.g., power down, etc.) as determined at step 166.

Figure 10:
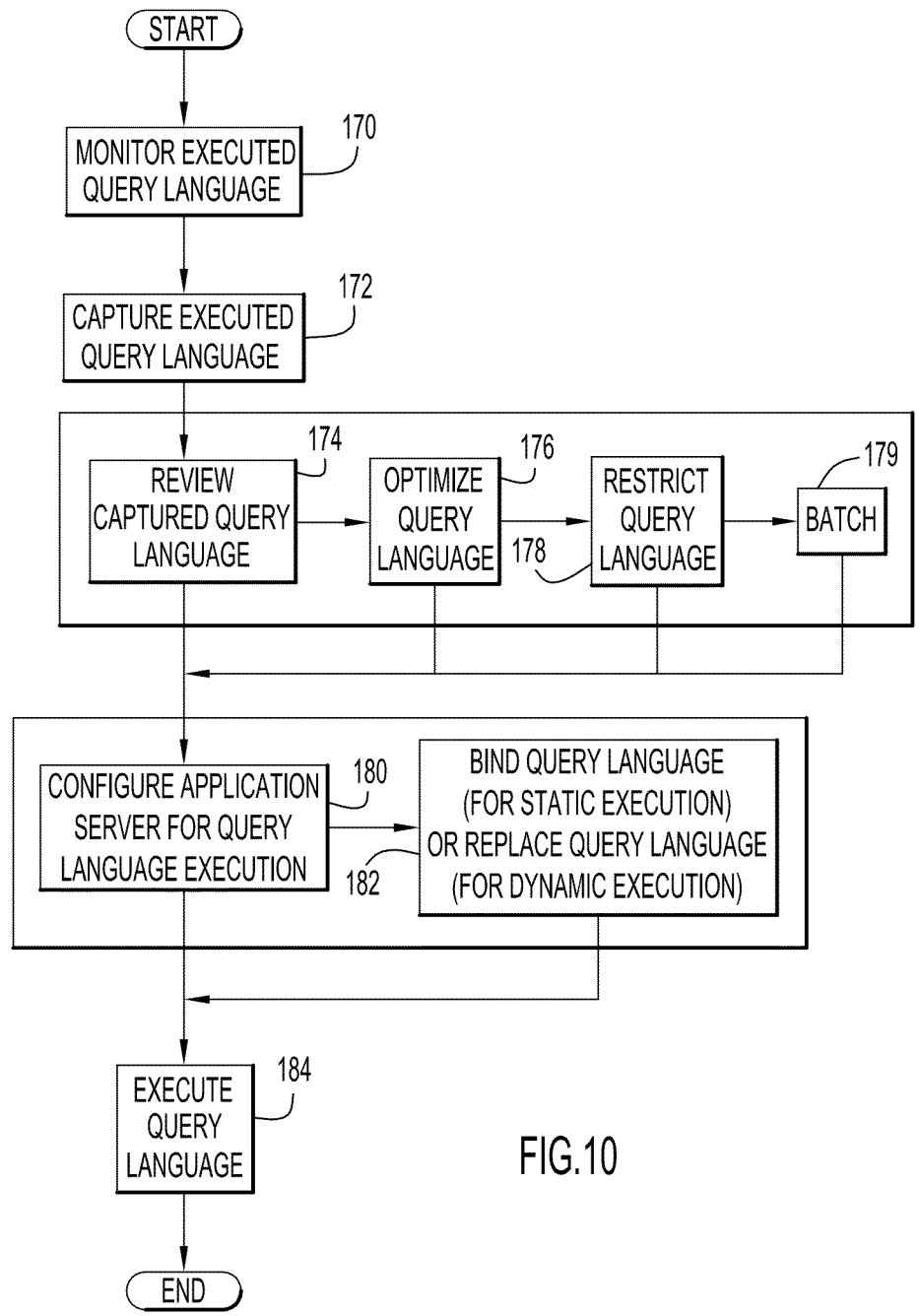
FIG. 10 is a procedural flowchart illustrating the manner in which query language execution (e.g., SQL, etc.) is controlled according to an embodiment of the present invention.

Present invention embodiments further enable administrators (e.g., database administrators, system administrators, or other users) to influence the query language (e.g., SQL, etc.) execution model at the application server as described above. The manner in which a query language execution model for a database application may be controlled is illustrated in FIG. 10. Initially, configuration control 20 receives and facilitates execution of query language (e.g., SQL, etc.) statements from other program stack layers 82 as described above (e.g., via an IBM pureQuery framework). Specifically, configuration control 20 monitors execution of query language (e.g., SQL, etc.) statements at step 170, and captures the statements at step 172. The configuration control captures the query language statements and tracks various related information (e.g., the database application and the particular program stack layer providing the statement, time, etc.). Captured query language (e.g., SQL, etc.) statements are stored by configuration control 20, preferably in a file (e.g., XML, etc.). The file is sent to controller 32 for storage by configuration manager service 34 in configuration repository 60.

Figure 11:
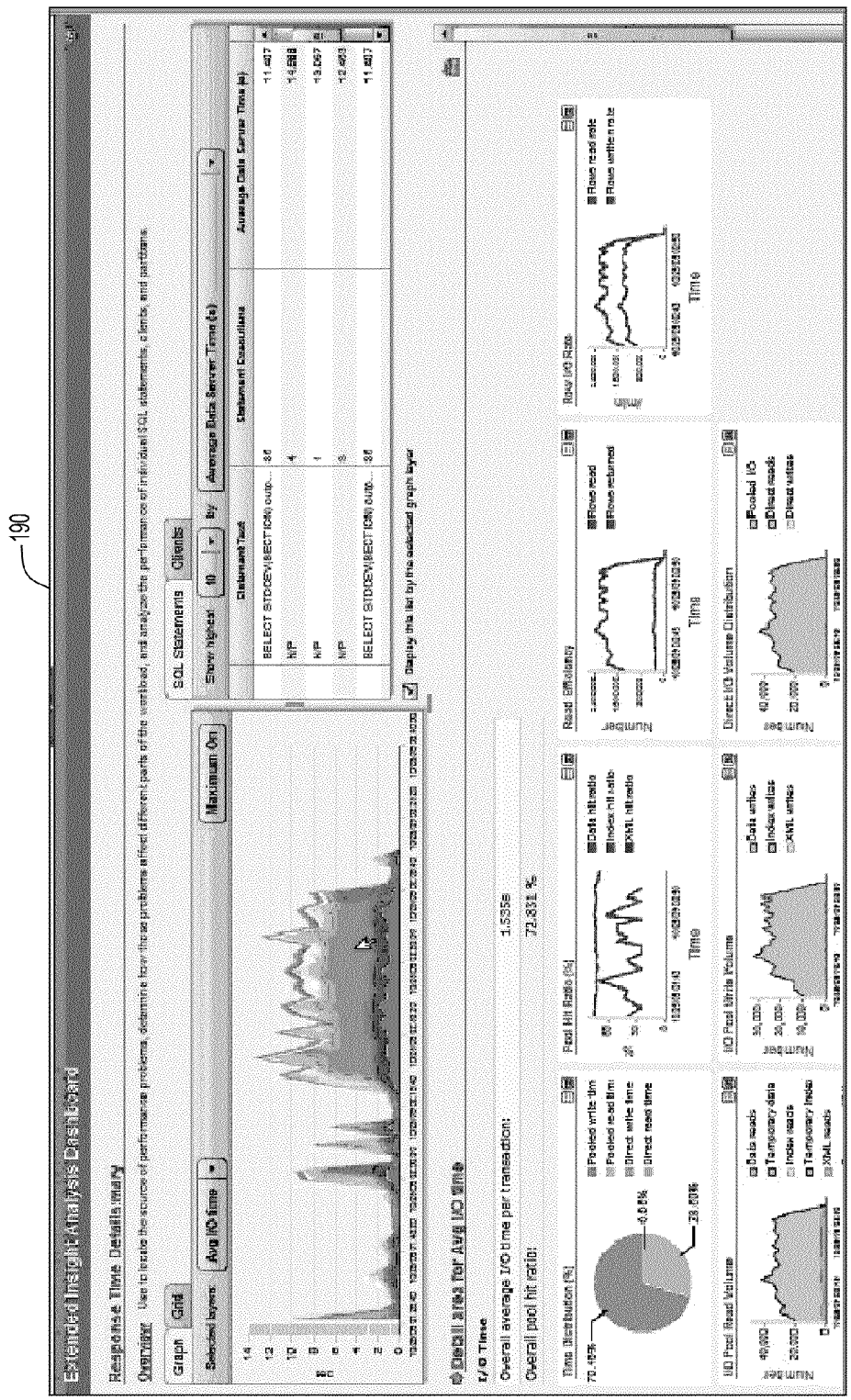
FIG. 11 is a schematic illustration of an example graphical user interface screen providing various performance information pertaining to query language (e.g., SQL, etc.) execution according to an embodiment of the present invention.

Once the query language (e.g., SQL, etc.) statements are captured, configuration manager service 34 may retrieve the statements from configuration repository 60 for presentation to an administrator (e.g., database administrator, system administrator, or other user) on an end-user system 90 via configuration manager interface 40. The administrator may review the statements and various performance or other information (e.g., execution time for each statement, etc.) at step 174. The performance information is based on the captured information and information collected from one or more corresponding databases 50 that executed the statements. An example graphical user screen 190 providing various performance information pertaining to query language (e.g., SQL, etc.) execution is illustrated in FIG. 11. Screen 190 includes various example graphical representations and charts pertaining to query language (e.g., SQL, etc.) statements and their execution by one or more corresponding databases 50.

Referring back to FIG. 10, if a query language (e.g., SQL, etc.) statement does not conform to a performance threshold, the administrator may optimize the query language (e.g., SQL, etc.) statement at step 176. For example, configuration manager service 34 may present interface screen 155 (FIG. 6) enabling the administrator to enter an optimized query language set for a particular statement or series of statements as described above.

Further, the administrator may restrict the query language (e.g., SQL, etc.) statements that are executed at step 178. For example, configuration manager service 34 may present interface screen 155 (FIG. 6) enabling the administrator to create a list of query language (e.g., SQL, etc.) statements that are permitted to be executed on a given database as described above.

In addition, present invention embodiments may further enable the administrator to control batching of query language (e.g., SQL, etc.) statements transferred to database 50 for execution at step 179. For example, configuration manager service 34 may present interface screen 155 (FIG. 6) enabling the administrator to specify query language (e.g., SQL, etc.) statements to be batched together without changing the application code as described above. Once the optimizations, restrictions, and/or batching have been determined and entered, configuration manager service 34 stores the optimized query language set, and restriction and batching specifications as part of the application specific property information in configuration repository 60 based on configuration identifier 113 to register the information as described above.

When configuration control 20 is initialized or application specific property information has been updated, the configuration control receives application specific property information defining a configuration for the corresponding database application (e.g., including the optimized query language (e.g., SQL, etc.) set, corresponding parameters, and specifications for restriction and/or batching). Configuration control 20 configures the database application or performs initialization and other tasks at step 180. In the case of a configuration for static execution (e.g., a database application property or parameter indicates static execution), the optimized query language (e.g., SQL, etc.) may be bound to database 50 at step 182. However, when the configuration is for dynamic execution (e.g., a database application property or parameter indicates dynamic execution), configuration control 20 intercepts the query language (e.g., SQL, etc.) statements for execution by the database application, and replaces the intercepted statements with the appropriate optimized query language (e.g., SQL, etc.) for those layers at step 182. This enables the optimized query language (e.g., SQL, etc.) to be transferred to the database applications without manually modifying each database application or corresponding properties across multiple servers and geographies. The interception and replacement of query language statements may similarly be employed for static execution based on the application specific property information.

Once the query language (e.g., SQL, etc.) configuration is installed, query language statements may be transferred to database 50 in accordance with the restriction and/or batching specifications, and executed at step 184. For example, the connection usage may be optimized by use of a heterogeneous batch, and delaying the execution until a transaction is committed as described above. This enables a framework to assign the physical connection to the database application for a small amount of time for the execution. This batch may be specified in one or more properties or parameters of application specific property information associated with the database application as described above.

Moreover, delay of execution enables all query language (e.g., SQL, etc.) statements to be captured and analyzed by configuration control 20 to provide optimized batching of those statements. For example, redundant query language statements within the captured statement set may be removed, while similar statements in the captured set may be parameterized to consolidate statements. Further, the effects of the statements within the captured set may be analyzed by configuration control 20 to reduce the number of statements provided for execution, thereby enhancing performance (e.g., statements within the captured set providing addition of data followed by deletion of that data may be removed without adverse effects, etc.).

Figure 12:
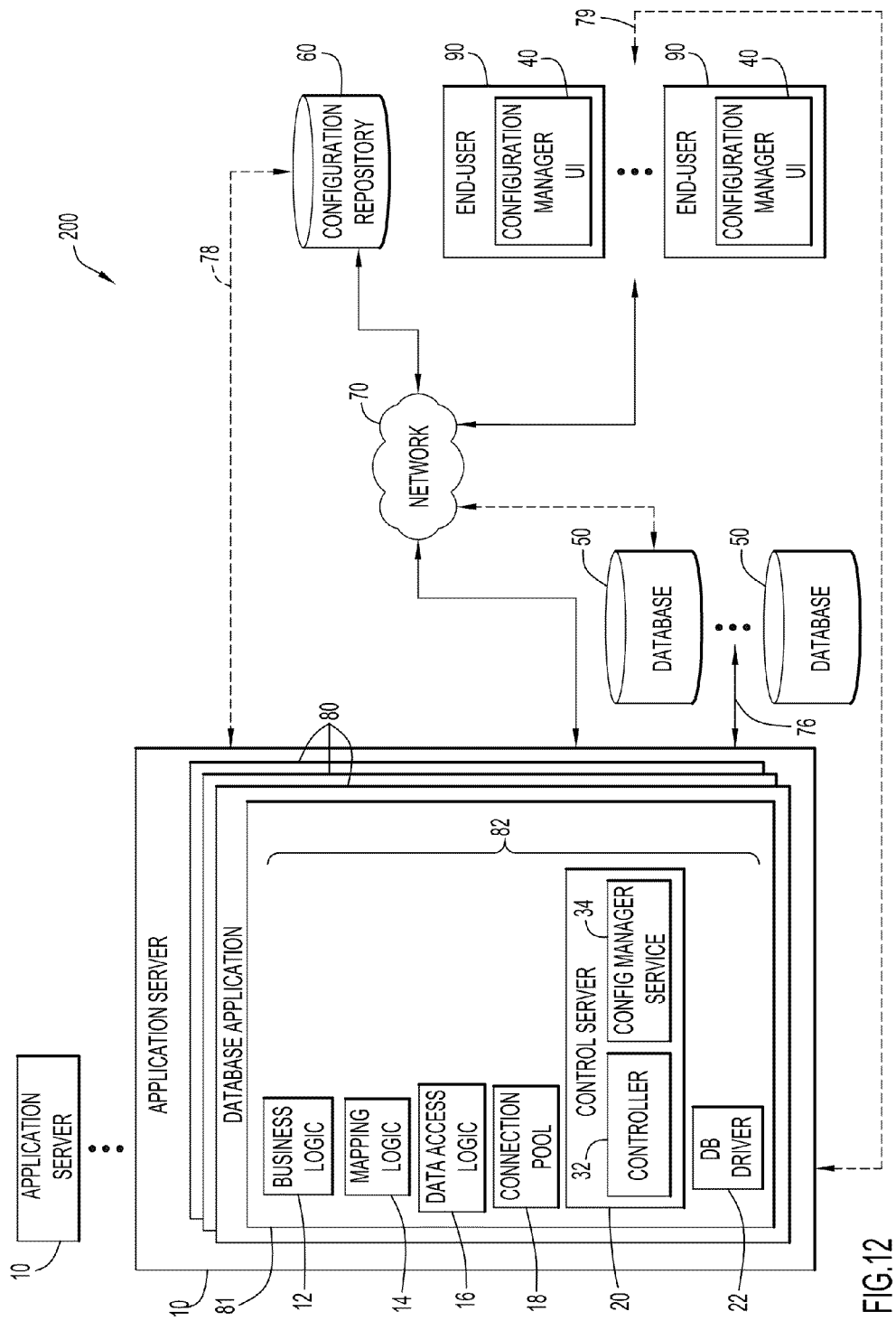
FIG. 12 is a diagrammatic illustration of an alternative example topology for a control system according to an embodiment of the present invention.

An alternative topology for the control system according to an embodiment of the present invention is illustrated in FIG. 12. Initially, control system 200 is substantially similar to control system 100 described above, where controller 32 and configuration manager service 34 are embedded within configuration control 20 of an application server program stack 81 to enable an application server 10 to directly access configuration repository 60 to retrieve application specific property information defining a configuration for a corresponding database application. Specifically, control system 200 includes one or more application servers 10 and configuration repository 60. The application servers and configuration repository may be remote from each other, and communicate over network 70. The network may be implemented by any number of any suitable communications media (e.g., wide area network (WAN), local area network (LAN), Internet, Intranet, etc.) as described above. Alternatively, configuration repository 60 may be local to application servers 10 and communicate via communication medium 78. The communication medium may be implemented by any suitable communication media (e.g., local area network (LAN), hardwire, wireless link, Intranet, etc.) as described above. In the case of configuration repository 60 being accessible by a network (e.g., LAN or WAN), the configuration repository may include, or be in the form of, a database server. The database server may be implemented by any conventional or other computer systems preferably equipped with a display or monitor, a base (e.g., including the processor, memories and/or internal or external communications devices (e.g., modem, network cards, etc.)), optional input devices (e.g., a keyboard, mouse or other input device), and any commercially available and/or custom software (e.g., server/communications software, etc.).

Application servers 10 are substantially similar to the application servers described above, where each application server is coupled to a corresponding transaction or other database 50. Databases 50 and configuration repository 60 are substantially similar to the databases and configuration repository described above. Each application server and corresponding database may be remote from each other, and communicate over network 70. Alternatively, the application servers and corresponding databases may be local to each other and communicate via communication medium 76. The communication medium may be implemented by any suitable communication media (e.g., local area network (LAN), hardwire, wireless link, Intranet, etc.) as described above. In the case of a database 50 being accessible by a network (e.g., LAN or WAN), the database may include, or be in the form of, a database server. The database server may be implemented by any conventional or other computer systems preferably equipped with a display or monitor, a base (e.g., including the processor, memories and/or internal or external communications devices (e.g., modem, network cards, etc.)), optional input devices (e.g., a keyboard, mouse or other input device), and any commercially available and/or custom software (e.g., server/communications software, etc.).

Each application server 10 includes one or more database applications 80 (e.g., including or associated with software applications processing data from a corresponding database 50 to perform desired actions, the corresponding underlying processes implementing database access to retrieve data from a corresponding database 50 for that processing, connections to a corresponding database 50, and/or query language (e.g., SQL, etc.) execution models). The software applications processing data from database 50, and the corresponding underlying processes (e.g., including managing database connections) are provided in a program stack 81. Each application server 10 includes one or more database applications 80 each including a program stack 81 with plurality of layers 82 that interoperate to provide access to a corresponding database 50 and implement a query language (e.g., SQL, etc.) execution model as described above. Each database application is associated with application specific property information defining one or more configurations for that database application and including various properties or parameters that control the manner in which a corresponding database 50 is accessed. The various properties or parameters of application specific property information for a database application may pertain to application server 10 and/or one or more program stack layers 82. In addition, each database application 80 (e.g., via program stack 81) implements an execution model with associated application specific property information including properties or parameters that control the manner in which a database query in the form of a query language (e.g., SQL, etc.) statement is executed as described above.

Configuration repository 60 stores application specific property information (e.g., including properties for application server 10, layers 82 of program stack 81, database connections, and/or the query language (e.g., SQL, etc.) execution model) defining configurations for database applications to configure the database applications as described above. Control system 200 basically employs the functionality of control server 30 described above within an application server 10 to enable an administrator (e.g., database administrator, system administrator, or other user) to centrally control database applications.

In particular, configuration control 20 includes controller 32 and configuration manager service 34, each substantially similar to the controller and configuration manager service described above. Configuration manager service 34 interacts with configuration manager interface 40 of one or more end-user systems 90 to enable the administrator to view, define, enter, and/or edit the application specific property information to centrally control and configure database applications in substantially the same manner described above. The entered application specific property information is stored by configuration manager service 34 in configuration repository 60 based on configuration identifier 113 as described above. End-user systems 90 and application servers 10 may be remote from each other, and communicate over network 70. Alternatively, end-user systems 90 may be local to application servers 10 and communicate via communications medium 79. The network may be implemented by any number of any suitable communications media (e.g., wide area network (WAN), local area network (LAN), Internet, Intranet, etc.) as described above.

Controller 32 interoperates with configuration manager service 34 to retrieve the application specific property information defining a desired configuration for a corresponding database application from configuration repository 60 based on configuration identifier 113 in substantially the same manner described above. The application specific property information is retrieved in response to initialization of controller 32, or in response to updates to the application specific property information as described above. Controller 32 may utilize a specified URL or address for configuration repository 60 to establish communications, or an automatic detection mechanism may be employed to detect the configuration repository in substantially the same manner described above.

Once the application specific property information is retrieved, controller 32 provides the retrieved application specific property information to configuration control 20. The configuration control applies the application specific property information to configure the corresponding database application in substantially the same manner described above. The controller and configuration service manager may alternatively be embedded within or form one or more layers within a program stack 81 of an application server 10, or reside on the application server outside, but accessible to, one or more program stacks of an application server to configure database applications.

It will be appreciated that the embodiments described above and illustrated in the drawings represent only a few of the many ways of implementing embodiments for centralized control of database applications.

The topology of the present invention embodiments may include any number of computer or other processing systems (e.g., database, application, control, or other server systems, end-user systems, etc.) and databases or other repositories arranged in any desired fashion, where the present invention embodiments may be applied to any desired type of computing environment (e.g., cloud computing, client-server (e.g., the application server (or configuration control) serving as the client with the control server (or controller) serving as the server), network computing, mainframe, etc.). The computer or other processing systems employed by the present invention embodiments may be implemented by any number of any personal or other type of computer or processing system (e.g., IBM-compatible, Apple, Macintosh, laptop, palm pilot, etc.), and may include any commercially available operating system (e.g., Windows, OS/2, Unix, Linux, etc.) and any commercially available or custom software (e.g., browser software, communications software, server software, control software (e.g., controller, configuration manager service, configuration manager interface, program stack layers, etc.). These systems may include any types of monitors and input devices (e.g., keyboard, mouse, voice recognition, etc.) to enter and/or view information.

It is to be understood that the software (e.g., controller, configuration manager service, configuration manager interface, program stack layers, etc.) for the computer systems of the present invention embodiments may be implemented in any desired computer language and could be developed by one of ordinary skill in the computer arts based on the functional descriptions contained in the specification and flow charts illustrated in the drawings. For example, the controller and configuration manager service may be implemented in Java, while the configuration control may be implemented in C++. Further, any references herein of software performing various functions generally refer to computer systems or processors performing those functions under software control. The computer systems of the present invention embodiments may alternatively be implemented by any type of hardware and/or other processing circuitry.

The various functions of the computer systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user, control server, application server, and database server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments (e.g., controller, configuration manager service, configuration manager interface, program stack layers, etc.) may be available on a recordable medium (e.g., magnetic or optical mediums, magneto-optic mediums, floppy diskettes, CD-ROM, DVD, memory devices, etc.) for use on stand-alone systems or systems connected by a network or other communications medium.

The communication network may be implemented by any number of any type of communications network (e.g., LAN, WAN, Internet, Intranet, VPN, etc.). The computer systems of the present invention embodiments (e.g., database, application, control, or other server systems, end-user systems, etc.) may include any conventional or other communications devices to communicate over the network via any conventional or other protocols. The computer systems (e.g., database, application, control, or other server systems, end-user systems, etc.) may utilize any type of connection (e.g., wired, wireless, etc.) for access to the network. The communication media may be implemented by any suitable communication media (e.g., local area network (LAN), hardwire, wireless link, Intranet, etc.).

The databases and repositories may be implemented by any number of any conventional or other databases, data stores or storage structures (e.g., files, databases, data structures, data or other repositories, etc.). The databases may be remote from or local to each other, and/or the server systems (e.g., the application servers, control servers, database servers, etc.). The application specific property information may include any desired application specific or other information, and all or any portion of the application specific property information may be stored in any number of databases, data repositories, or storage units that may be local to or remote from each other. For example, all or a portion of the application specific property information may be stored in one or more databases 50.

The database application may include any number of any components enabling processing of data in a database (e.g., program stack, application server software, any portions of one or more layers of a program stack, any portions of application server software, etc.). The program stack may include any number of layers arranged in any fashion and providing any desired functionality (e.g., transactional functions, mapping functions, connection and/or access functions, communication functions, etc.). The database application may provide business or any other type of implementation for processing data stored in a database. The database application (or any portion thereof) may be associated with any number of identifiers. The database application and configuration identifiers may include any number of any suitable characters or symbols (e.g., alphanumeric, punctuation or other symbols, etc.), or any other suitable information (attributes, one or more additional identifiers, etc.). The database application and/or configuration identifiers may be used to store and/or retrieve any suitable information for a database application or portion thereof (e.g., property, runtime information, etc.). For example, separate database application and/or configuration identifiers may be used for each portion (e.g., program stack layer, application server, etc.) of a database application to retrieve and apply application specific property information including properties for those portions. In this case, one or more specific portions of a database application may be configured. In addition, a database application may be associated with any number of configurations, where the configuration identifier to retrieve each configuration may include a database application identifier and any additional information (e.g., attributes, an identifier for the particular configuration, etc.). The database application and/or configuration identifiers may be utilized in any suitable fashion to retrieve or determine locations (e.g., filenames, addresses, pointers, etc.) within the configuration repository of the desired application specific property information (e.g., lookup table, key or other field of a database table, etc.).

The application specific property information may include any suitable application specific or other information (e.g., attributes, properties, characteristics, operational parameters, etc.) for a database application or other entity, and may be associated with any portion of that database application (e.g., one or more layers of a program stack, application server, etc.). The application specific property information may be stored in the configuration repository or other databases or storage units any fashion (e.g., based on the database application and/or configuration identifiers or other index, based on the property characteristics or associated portions of the database application, etc.). The database applications and/or properties of application specific property information may be grouped based on any suitable criteria (e.g., data source, connection, etc.). The application specific property information may be stored locally on an application server and/or within a remote or local repository. Any number of properties or application specific property information may be stored and/or retrieved to configure a database application.

The presence of centralized or other control may be detected in any suitable fashion (e.g., a flag or other indicator, uniform resource locator (URL) or address of the control provider, automatic detection mechanism, etc.). The application specific property information for a database application may be applied in any suitable fashion (e.g., storing retrieved property values in corresponding configuration variables, memory or other storage locations (e.g., files, registers, etc.), etc.). The retrieval of updated information may be polled (e.g., transmission of a request for updated information) at any desired time intervals (e.g., minutes, seconds, etc.), and may be periodic or at various instances. The updated information may alternatively be automatically retrieved and provided to database applications at any desired time intervals (e.g., minutes, seconds, immediately after an update, etc.). The exceptions or messages may include any desired information (e.g., error codes, explanations, indicators, etc.), and may be provided to any interested parties (e.g., any administrators or other users, etc.) in response to any conditions (e.g., errors or other conditions pertaining to retrieving data, configuring a database or other application).

The present invention embodiments may employ any number or type of user interface (e.g., Graphical User Interface (GUI), command-line, prompt, etc.), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The control system may be operated by any suitable user to configure database applications (e.g., database administrator, system administrator, end-user, etc.). The interface screens may include any suitable actuators (e.g., links, tabs, etc.) to navigate between the screens in any fashion.

The query language optimization may be performed in any fashion (e.g., manually, a query language optimizer, etc.), while the query language statements may be restricted from execution in any manner (e.g., providing statements or statement attributes permitted to be executed, providing statements or statement attributes not permitted to be executed, etc.). The query language statement batch may be performed in any desired fashion (e.g., manually specifying statements to batch, etc.). The statements may be captured and analyzed in any fashion to determine a batching sequence. The batch execution may be deferred for any desired time interval or, alternatively, batch execution may be performed at a specified time or a programmatic interval (e.g., transactional boundary, etc.). The query language execution model may be utilized for any desired query or other language (e.g., SQL, etc.).

The database application control may be performed from a single central platform (e.g., central controller, etc.) to provide centralized control over all database applications within an enterprise system. Alternatively, control of database applications may be performed from any number of platforms, where each platform may control any suitable aspects or portions of one or more database applications within an enterprise.

The present invention embodiments are not limited to the utilizations or application specific property information discussed above, but may be employed to centrally view, define, and/or modify any desired application specific property information of any database application or related items to configure those items. For example, the control system may enable a user to centrally set initial database connectivity configuration for database applications, and centrally control redirection of database applications from a currently-configured database connection to a different database connection. The number of connections may be a property of a database and indicate the number of open connections allowed to the database, where actions of the database application are controlled based on the number of connections to the database. By way of example, database applications may take different courses of action based on the number of connections to the database being active or exhausted. Alternatively, the number of connections may be a property of a database application and indicate the number of open connections allowed to be maintained in a connection pool. Further, the control system may enable a user to centrally view the topology, including which database applications are configured and the databases connected to those database applications.

The control system may track and store configuration changes in the configuration repository, and enable a user to centrally view an audit trail of those changes. The control system may enable a user to centrally define arbitrary logical, hierarchical groupings of database applications and databases, and centrally view databases or database applications and their configuration by the defined logical, hierarchical groupings and policies.

Moreover, the control system may enable a user to centrally view and control application server data sources without application server re-configuration (that can be complex and error prone) or server restart, and centrally change arbitrary database application configuration properties. The control system may further enable a user to centrally manage database application static query language (e.g., SQL, etc.)

usage, and change the query language programming model. In addition, the control system may enable a user to centrally view all the database application settings including driver levels, environment information, application properties and web server information.

The techniques of the present invention embodiments are not limited to control of database applications, but may be applied to control and/or configure any suitable implementations (e.g., networks, computers (e.g., servers, clients, etc.), computer or other environments, tools, simulations, processing or other devices, etc.). The identifiers may associate database applications with application specific property information (e.g., index or key, etc.) and/or application servers (e.g., via a lookup table or other manners to link with URLs, addresses or other identifiers of application servers, etc.) in any fashion.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer-implemented method of controlling database applications comprising:
    retrieving application specific property information for at least one of a plurality of database applications from a data repository, wherein said data repository provides centralized control of the application specific property information for the plurality of database applications, wherein said at least one of the database applications provides access to a database system, wherein said application specific property information controls application specific access to said database system through at least one of a database connection property or a query language execution model, and wherein said application specific property information includes a number of connections to control the number of connections to said database system maintained by said at least one of the plurality of database applications;
    applying said retrieved application specific property information to said at least one of the plurality of database applications to control said database application; and
    connecting to the database system without using a centralized gateway.

2. The method of claim 1, wherein said application specific property information includes one or more properties associated with the query language execution model of said at least one of the plurality of database applications to control execution of query language statements.

3. The method of claim 2, wherein said application specific property information includes optimized query language statements for execution, and said applying said application specific property information includes binding said optimized query language statements to said database system in response to said application specific property information indicating static execution of said query language statements.

4. The method of claim 2, wherein said application specific property information includes optimized query language statements for execution, and said applying said application specific property information includes intercepting and replacing query language statements of said at least one of the plurality of database applications with said optimized query language statements in response to said application specific property information indicating replacement of said query language statements.

5. The method of claim 2, wherein said application specific property information includes an indication of at least one query language statement permitted for execution to control said at least one of the plurality of database applications.

6. The method of claim 2, wherein said application specific property information includes an indication of at least one query language statement prohibited from execution to control said at least one of the plurality of database applications.

7. The method of claim 2, wherein said application specific property information includes an indication of query language statements to be batched for execution to control said at least one of the plurality of database applications.

8. The method of claim 1, wherein said at least one of the plurality of database applications includes a program stack with a plurality of layers to access said database system, and wherein said application specific property information includes one or more properties associated with at least one layer of said program stack to control said at least one of the plurality of database applications.

9. The method of claim 1, wherein said application specific property information includes a number of connections to control actions of the at least one of the plurality of database applications based on the number of connections to said database system.

10. The method of claim 1, wherein said retrieving said application specific property information includes:
    determining the presence of updated application specific property information for said at least one of the plurality of database applications; and
    retrieving said updated application specific property information from said data repository.

11. The method of claim 1, wherein said data repository stores application specific property information for said plurality of database applications, and wherein said retrieving said application specific property information includes:
    retrieving application specific property information for each of the plurality of database applications from said data repository based on respective identifiers.

12. The method of claim 11, wherein at least two of said plurality of database applications reside on different computer systems.

13. The method of claim 1, wherein said at least one of the plurality of database applications is associated with a plurality of configurations each stored in said data repository and including said application specific property information to configure said at least one of the plurality of database applications for a corresponding desired operation.

14. The method of claim 1, wherein said retrieving said application specific property information includes:
    intercepting executed query language statements of said at least one of the plurality of database applications and providing performance information pertaining to execution of those statements; and
    associating said executed query language statements with optimized query language statements for execution based on a relation of said performance information to a threshold, wherein said application specific property information includes said optimized query language statements.

15. The computer-implemented method of claim 1, wherein:
    retrieving said application specific property information for said at least one of the plurality of database applications co comprises a plurality of application servers retrieving said application specific property information;

applying said retrieved application specific property information to said at least one of the plurality of database applications comprises applying said retrieved application specific property information to said at least one of the plurality of database applications at each of said plurality of database servers; and connecting to the database system without using a centralized gateway comprises connecting each of the database servers to the database system without using a centralized gateway.

16. A system for controlling database applications comprising:
a computer system including a database application to provide access to a database system, wherein said computer system further includes at least one processor configured to:
request retrieval of application specific property information for said database application from a data repository, wherein said data repository provides centralized control of the application specific property information for a plurality of database applications, wherein said application specific property information controls application specific access to said database system through at least one of a database connection property or a query language execution model, and wherein said application specific property information includes a number of connections to control the number of connections to said database system maintained by said database application;
apply said retrieved application specific property information to said database application to control said database application; and
connect to the database system without using a centralized gateway.

17. The system of claim 16, wherein said application specific property information includes one or more properties associated with the query language execution model of said database application to control execution of query language statements.

18. The system of claim 17, wherein said application specific property information includes optimized query language statements for execution, and said optimized query language statements are bound to said database system in response to said application specific property information indicating static execution of said query language statements.

19. The system of claim 17, wherein said application specific property information includes optimized query language statements for execution, and said at least one processor is further configured to intercept and replace query language statements of said database application with said optimized query language statements in response to said application specific property information indicating replacement of said query language statements.

20. The system of claim 17, wherein said application specific property information includes an indication of at least one query language statement permitted for execution to control said database application.

21. The system of claim 17, wherein said application specific property information includes an indication of at least one query language statement prohibited from execution to control said database application.

22. The system of claim 17, wherein said application specific property information includes an indication of query language statements to be batched for execution to control said database application.

23. The system of claim 16, wherein said database application includes a program stack with a plurality of layers to access said database system, and wherein said application specific property information includes one or more properties associated with at least one layer of said program stack to control said database application.

24. The system of claim 16, wherein said application specific property information includes a number of connections to control actions of the database application based on the number of connections to said database system.

25. The system of claim 16, wherein said at least one processor is further configured to:
periodically request retrieval of updated application specific property information for said database application from said data repository.

26. The system of claim 16, wherein said data repository stores application specific property information for said plurality of database applications, wherein said system further includes a plurality of computer systems each including a database application and at least one processor configured to:
retrieve application specific property information for a corresponding database application from said data repository based on an identifier.

27. The system of claim 16, further including:
a control system in communication with said data repository and including at least one processor configured to:
receive a request from said computer system and retrieve said application specific property information for said database application from said data repository based on an identifier; and
provide said retrieved application specific property information to said computer system.

28. The system of claim 16, further including:
a control system in communication with said data repository and including at least one processor configured to:
determine the presence of updated application specific property information for said database application; and
retrieve said updated application specific property information for said database application from said data repository and provide said updated application specific property information to said computer system.

29. The system of claim 16, wherein said database application is associated with a plurality of configurations each stored in said data repository and including said application specific property information to configure said database application for a corresponding desired operation.

30. The system of claim 16, wherein said at least one processor is further configured to:
intercept executed query language statements of said database application and provide performance information pertaining to execution of those statements; and
associate said executed query language statements with optimized query language statements for execution based on a relation of said performance information to a threshold, wherein said application specific property information includes said optimized query language statements.

31. A computer program product for controlling database application comprising:
a computer readable storage medium having computer readable program code embodied therewith, the computer readable program code comprising computer readable program code configured to:

request retrieval of application specific property information for said database application from a data repository, wherein said data repository provides centralized control of the application specific property information for a plurality of database applications, wherein said database application provides access to a database system, wherein said application specific property information controls application specific access to said database system, and wherein said application specific property information includes a number of connections to control the number of connections to said database system maintained by said database application;

apply said retrieved application specific property information to said database application to control said database application through at least one of a database connection property or a query language execution model, and connect to the database system without using a centralized gateway.

32. The computer program product of claim 31, wherein said application specific property information includes one or more properties associated with the query language execution model of said database application to control execution of query language statements.

33. The computer program product of claim 32, wherein said application specific property information includes optimized query language statements for execution, and said applying said application specific property information includes binding said optimized query language statements to said database system in response to said application specific property information indicating static execution of said query language statements.

34. The computer program product of claim 32, wherein said application specific property information includes optimized query language statements for execution, and said applying said application specific property information includes intercepting and replacing query language statements of said database application with said optimized query language statements in response to said application specific property information indicating replacement of said query language statements.

35. The computer program product of claim 32, wherein said application specific property information includes an indication of at least one query language statement permitted for execution to control said database application.

36. The computer program product of claim 32, wherein said application specific property information includes an indication of at least one query language statement prohibited from execution to control said database application.

37. The computer program product of claim 32, wherein said application specific property information includes an indication of query language statements to be batched for execution to control said database application.

38. The computer program product of claim 31, wherein said database application includes a program stack with a plurality of layers to access said database system, and wherein said application specific property information includes one or more properties associated with at least one layer of said program stack to control said database application.

39. The computer program product of claim 31, wherein said application specific property information includes a number of connections to control actions of the database application based on the number of connections to said database system.

40. The computer program product of claim 31, wherein said computer readable program code is further configured to:
periodically request retrieval of updated application specific property information for said database application from said data repository.

41. The computer program product of claim 31, wherein said data repository stores application specific property information for a plurality of database applications, wherein said computer readable program code includes computer readable program code configured to enable each of a plurality of computer systems each including a database application and at least one processor to:
retrieve application specific property information for a corresponding database application from said data repository based on an identifier.

42. The computer program product of claim 31, wherein said computer readable program code includes computer readable program code configured to enable a control system in communication with said data repository to:
receive a request and retrieve said application specific property information for said database application from said data repository based on an identifier; and
provide said retrieved application specific property information to configure said database application.

43. The computer program product of claim 31, wherein said computer readable program code includes computer readable program code configured to enable a control system in communication with said data repository to:
determine the presence of updated application specific property information for said database application; and
retrieve said updated application specific property information for said database application from said data repository and provide said updated application specific property information to configure said database application.

44. The computer program product of claim 31, wherein said database application is associated with a plurality of configurations each stored in said data repository and including said application specific property information to configure said database application for a corresponding desired operation.

45. The computer program product of claim 31, wherein said computer readable program code includes computer readable program code configured to:
intercept executed query language statements of said database application and provide performance information pertaining to execution of those statements; and
associate said executed query language statements with optimized query language statements for execution based on a relation of said performance information to a threshold, wherein said application specific property information includes said optimized query language statements.

46. A computer-implemented method of controlling database applications comprising:
retrieving application specific property information for a database application from a data repository comprising a plurality of application specific property information for a plurality of database applications, wherein said data repository provides centralized control of the application specific property information for the plurality of database applications, wherein said database application provides access to a database system, wherein the application specific property information controls application specific access to the database system through at least one of a database connection property or a query language execution mode, and wherein said application specific property information includes a number of connections to control the number of connections to said database system maintained by said database application;

applying said retrieved application specific property information to said database application to control said database application, and connecting to the database system without using a centralized gateway.

47. The method of claim 46, wherein said application specific property information includes one or more properties associated with the query language execution model of said database application to control execution of query language statements.

48. The method of claim 46, wherein said database application includes a program stack with a plurality of layers to access said database system, and wherein said application specific property information includes one or more properties associated with at least one layer of said program stack to control said database application.

49. The method of claim 46, wherein said retrieving said application specific property information includes:
determining the presence of updated application specific property information for said database application; and
retrieving said updated application specific property information from said data repository.

50. The computer-implemented method of claim 46, wherein:
retrieving said application specific property information for said at least one of the plurality of database applications comprises a plurality of application servers retrieving said application specific property information;
applying said retrieved application specific property information to said at least one of the plurality of database applications comprises applying said retrieved application specific property information to said at least one of the plurality of database applications at each of said plurality of database servers; and
connecting to the database system without using a centralized gateway comprises connecting each of the database servers to the database system without using a centralized gateway.

51. The method of claim 46, wherein said data repository stores application specific property information for said plurality of database applications, and wherein said retrieving said application specific property information includes:
retrieving application specific property information for each of the plurality of database applications from said data repository based on respective identifiers.

52. The method of claim 46, wherein said at least one of the plurality of database applications is associated with a plurality of configurations each stored in said data repository and including said application specific property information to configure said at least one of the plurality of database applications for a corresponding desired operation.

53. A system for controlling database applications comprising:
a computer system including a database application to provide access to a database system, wherein said computer system further includes at least one processor configured to:
request retrieval of application specific property information for said database application from a data repository comprising a plurality of application specific property information for a plurality of database applications through at least one of a database connection property or a query language execution mode, wherein said data repository provides centralized control of the application specific property information for the plurality of database applications, and wherein said application specific property information includes a number of connections to control the number of connections to said database system maintained by said database application;
apply said retrieved application specific property information to said database application to control said database application and control application specific access to the database system; and
connect to the database system without using a centralized gateway.

54. The system of claim 53, wherein said application specific property information includes one or more properties associated with the query language execution model of said database application to control execution of query language statements.

55. The system of claim 53, wherein said database application includes a program stack with a plurality of layers to access said database system, and wherein said application specific property information includes one or more properties associated with at least one layer of said program stack to control said database application.

56. The system of claim 53, wherein said at least one processor is further configured to:
periodically request retrieval of updated application specific property information for said database application from said data repository.

57. The system of claim 53, further including:
a control system in communication with said data repository and including at least one processor configured to:
receive a request from said computer system and retrieve said application specific property information for said database application from said data repository based on an identifier; and
provide said retrieved application specific property information to said computer system.

58. The system of claim 53, wherein said database application is associated with a plurality of configurations each stored in said data repository and including said application specific property information to configure said database application for a corresponding desired operation.

59. The system of claim 53, wherein said at least one processor is further configured to:
intercept executed query language statements of said database application and provide performance information pertaining to execution of those statements; and
associate said executed query language statements with optimized query language statements for execution based on a relation of said performance information to a threshold, wherein said application specific property information includes said optimized query language statements.

60. A computer program product for controlling database applications comprising:
a computer readable storage medium having computer readable program code embodied therewith, the computer readable program code comprising computer readable program code configured to:
request retrieval of application specific property information for said database application from a data repository comprising a plurality of application specific property information for a plurality of database applications through at least one of a database connection property of a query language execution model, wherein said data repository provides centralized control of the application specific property information for the plurality of database applications, and wherein said application specific property information includes a number of connections to control the number of connections to said database system maintained by said database application;

apply said retrieved application specific property information to said database application to control said database application and control application specific access to the database system; and connect to the database system without using a centralized gateway.

61. The computer program product of claim 60, wherein said application specific property information includes one or more properties associated with the query language execution model of said database application to control execution of query language statements.

62. The computer program product of claim 60, wherein said database application includes a program stack with a plurality of layers to access said database system, and wherein said application specific property information includes one or more properties associated with at least one layer of said program stack to control said database application.

63. The computer program product of claim 60, wherein said computer readable program code includes computer readable program code configured to enable a control system in communication with said data repository to:

receive a request and retrieve said application specific property information for said database application from said data repository based on an identifier; and provide said retrieved application specific property information to configure said database application.

64. The computer program product of claim 60, wherein said database application is associated with a plurality of configurations each stored in said data repository and including said application specific property information to configure said database application for a corresponding desired operation.

65. The computer pro am product of claim 60, wherein said computer readable program code includes computer readable program code configured to:

intercept executed query language statements of said database application and provide performance information pertaining to execution of those statements; and associate said executed query language statements with optimized query language statements for execution based on a relation of said performance information to a threshold, wherein said application specific property information includes said optimized query language statements.

* * * * *